United States Patent
Lee et al.

(10) Patent No.: US 12,299,206 B2
(45) Date of Patent: May 13, 2025

(54) SYSTEMS, APPARATUS, AND METHODS FOR GESTURE-BASED AUGMENTED REALITY, EXTENDED REALITY

(71) Applicant: SoftEye, Inc., San Diego, CA (US)

(72) Inventors: Te-Won Lee, San Diego, CA (US); Edwin Chongwoo Park, San Diego, CA (US)

(73) Assignee: SoftEye, Inc., San Diego, CA (US)

( * ) Notice: Subject to any disclaimer, the term of this patent is extended or adjusted under 35 U.S.C. 154(b) by 0 days.

(21) Appl. No.: 18/061,203

(22) Filed: Dec. 2, 2022

(65) Prior Publication Data

US 2023/0305632 A1   Sep. 28, 2023

Related U.S. Application Data

(60) Provisional application No. 63/340,470, filed on May 11, 2022, provisional application No. 63/285,453, filed on Dec. 2, 2021.

(51) Int. Cl.
*G06F 3/01* (2006.01)
*G06F 3/16* (2006.01)
(Continued)

(52) U.S. Cl.
CPC .............. *G06F 3/017* (2013.01); *G06F 3/013* (2013.01); *G06F 3/167* (2013.01); *G06T 11/00* (2013.01);
(Continued)

(58) Field of Classification Search
CPC .......... G06F 3/017; G06F 3/013; G06F 3/167; G06T 11/00; G06V 10/25; G06V 10/26; G06V 10/28; G06V 10/70; G06V 10/82; G06V 40/18; G06V 40/20; G06V 40/28; H04N 23/651
See application file for complete search history.

(56) References Cited

U.S. PATENT DOCUMENTS 9,471,153 B1 * 10/2016 Ivanchenko ............. G06T 7/70
9,619,105 B1    4/2017 Dal Mutto
(Continued)

OTHER PUBLICATIONS

U.S. Appl. No. 18/061,203, filed Dec. 2, 2022, Te-Won Lee.
(Continued)

*Primary Examiner* — James T Tsai
(74) *Attorney, Agent, or Firm* — Wang Hardoon, P.C.

(57) ABSTRACT

Systems, apparatus, and methods for a gesture-based augmented reality and/or extended reality (AR/XR) user interface. Conventional image processing scales quadratically based on image resolution. Processing complexity directly corresponds to memory size, power consumption, and heat dissipation. As a result, existing smart glasses solutions have short run-times (<1 hr) and may have battery weight and heat dissipation issues that are uncomfortable for continuous wear. The disclosed solution provides a system and method for low-power image processing via the use of scalable processing. In one specific implementation, gesture detection is divided into multiple stages. Each stage conditionally enables subsequent stages for more complex processing. By scaling processing complexity at each stage, high complexity processing can be performed on an "as-needed" basis.

20 Claims, 11 Drawing Sheets

(51) Int. Cl.
*G06T 11/00* (2006.01)
*G06V 10/25* (2022.01)
*G06V 10/26* (2022.01)
*G06V 10/28* (2022.01)
*G06V 10/70* (2022.01)
*G06V 10/82* (2022.01)
*G06V 40/18* (2022.01)
*G06V 40/20* (2022.01)
*H04N 23/65* (2023.01)

(52) U.S. Cl.
CPC ............ *G06V 10/25* (2022.01); *G06V 10/26* (2022.01); *G06V 10/28* (2022.01); *G06V 10/70* (2022.01); *G06V 10/82* (2022.01); *G06V 40/18* (2022.01); *G06V 40/20* (2022.01); *G06V 40/28* (2022.01); *H04N 23/651* (2023.01)

(56) References Cited

U.S. PATENT DOCUMENTS

| | | |
|---|---|---|
| 9,741,169 B1 | 8/2017 | Holz |
| 11,262,885 B1 | 3/2022 | Burckel |
| 11,847,266 B2 | 12/2023 | Lee et al. |
| 2013/0106681 A1 | 5/2013 | Eskilsson et al. |
| 2014/0118257 A1 | 5/2014 | Baldwin |
| 2015/0049017 A1 | 2/2015 | Weber et al. |
| 2015/0338915 A1 | 11/2015 | Publicover et al. |
| 2016/0274762 A1* | 9/2016 | Lopez ............... G06T 19/006 |
| 2017/0249009 A1 | 8/2017 | Parshionikar |
| 2018/0368074 A1 | 12/2018 | Gong et al. |
| 2019/0043415 A1 | 2/2019 | Sinha et al. |
| 2019/0324529 A1 | 10/2019 | Stellmach et al. |
| 2019/0362557 A1 | 11/2019 | Lacey et al. |
| 2019/0370529 A1 | 12/2019 | Kumar et al. |
| 2020/0051260 A1 | 2/2020 | Shen et al. |
| 2020/0092453 A1 | 3/2020 | Gordon et al. |
| 2020/0341546 A1* | 10/2020 | Yuan ..................... G06F 3/013 |
| 2020/0382717 A1 | 12/2020 | Chiu et al. |
| 2021/0072831 A1* | 3/2021 | Edwards ............... G06V 40/10 |
| 2021/0201661 A1 | 7/2021 | Jazaery et al. |
| 2021/0248427 A1 | 8/2021 | Guo et al. |
| 2021/0373657 A1* | 12/2021 | Connor ..................... G06T 5/90 |
| 2022/0101593 A1* | 3/2022 | Rockel ................. A63F 13/655 |
| 2022/0326367 A1 | 10/2022 | Matuszak et al. |
| 2022/0391697 A1 | 12/2022 | Mousavi et al. |
| 2023/0038159 A1 | 2/2023 | Holland et al. |
| 2023/0049339 A1* | 2/2023 | Ganguly ................. H04N 23/80 |
| 2023/0118074 A1* | 4/2023 | Park ......................... G01S 3/14 345/156 |
| 2023/0305632 A1 | 9/2023 | Lee et al. |
| 2023/0333384 A1* | 10/2023 | Zhu ......................... G06F 3/012 |
| 2023/0368326 A1 | 11/2023 | Lee et al. |
| 2023/0368328 A1 | 11/2023 | Lee et al. |
| 2023/0370752 A1 | 11/2023 | Lee et al. |

OTHER PUBLICATIONS

U.S. Appl. No. 18/061,226, filed Dec. 2, 2022, Te-Won Lee.
U.S. Appl. No. 18/061,257, filed Dec. 2, 2022, Te-Won Lee.
U.S. Appl. No. 18/185,362, filed Mar. 16, 2023, Edwin Chongwoo Park.
U.S. Appl. No. 18/185,364, filed Mar. 16, 2023, Edwin Chongwoo Park.
U.S. Appl. No. 18/185,366, filed Mar. 16, 2023, Edwin Chongwoo Park.
U.S. Appl. No. 18/316,181, filed May 11, 2023, Te-Won Lee.
U.S. Appl. No. 18/316,203, filed May 11, 2023, Edwin Chongwoo Park.
U.S. Appl. No. 18/316,206, filed May 11, 2023, Te-Won Lee.
U.S. Appl. No. 18/316,214, filed May 11, 2023, Te-Won Lee.
U.S. Appl. No. 18/316,218, filed May 11, 2023, Edwin Chongwoo Park.
U.S. Appl. No. 18/316,221, filed May 11, 2023, Edwin Chongwoo Park.
U.S. Appl. No. 18/316,225, filed May 11, 2023, Edwin Chongwoo Park.
U.S. Appl. No. 63/491,733, filed Mar. 22, 2023, Edwin Chongwoo Park.
U.S. Appl. No. 18/745,027, filed Jun. 17, 2024, SoftEye, Inc.
U.S. Appl. No. 18/745,233, filed Jun. 17, 2024, SoftEye, Inc.
U.S. Appl. No. 18/745,353, filed Jun. 17, 2024, SoftEye, Inc.
U.S. Appl. No. 18/745,462, filed Jun. 17, 2024, SoftEye, Inc.
Vaswani et al., "Attention Is All You Need," 31st Conference on Neural Information Processing Systems (NIPS 2017).

* cited by examiner

"1"

"2"

"3"

THUMBS UP/DOWN

SWIPE LEFT/RIGHT

SWIPE UP/DOWN

ROTATE INWARD/OUTWARD

SYSTEMS, APPARATUS, AND METHODS FOR GESTURE-BASED AUGMENTED REALITY, EXTENDED REALITY

PRIORITY

This application claims the benefit of priority to U.S. Provisional Patent Application Ser. No. 63/285,453 filed Dec. 2, 2021 and entitled "SYSTEM AND METHOD FOR SCALABLE PROCESSING FOR SMARTGLASSES", and U.S. Provisional Patent Application Ser. No. 63/340,470 filed May 11, 2022 and entitled "SYSTEM AND METHOD FOR SCALABLE PROCESSING FOR SMART-GLASSES", each of the foregoing incorporated by reference in their entirety.

RELATED APPLICATIONS

This application is related to U.S. patent Application Ser. No. 18/061,226 filed Dec. 2, 2022 and entitled "SYSTEMS, APPARATUS, AND METHODS FOR GESTURE-BASED AUGMENTED REALITY, EXTENDED REALITY", and U.S. patent Application Ser. No. 18/061,257 filed Dec. 2, 2022 and entitled "SYSTEMS, APPARATUS, AND METHODS FOR GESTURE-BASED AUGMENTED REALITY, EXTENDED REALITY", each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of user and machine interactions. More particularly, the present disclosure relates to systems, computer programs, devices, and methods for enabling a gesture-based user experience (UX) for augmented reality (AR) and/or extended reality (XR) applications.

DESCRIPTION OF RELATED TECHNOLOGY

Traditionally, the interaction between a user and an electronic device (e.g., smartphone, computer, etc.) relies on physical interactions, whether as physical keystrokes, physical movements of a mouse, physical contact on touchscreens, etc. Likewise, a display presents most of the information shared between the user and the electronic device. However, display-based interactions have limitations. For instance, the display may not be conveniently positioned (e.g., being in the pocket of the user). Similarly, access to the physical device may be limited (e.g., when the user is holding another object such as a suitcase).

Recently, "smart glasses" have garnered significant consumer interest. Smart glasses attempt to incorporate computer vision processing capabilities in an eyeglass form factor; for example, most implementations of smart glasses use cameras to capture images of the external world, and a heads-up display to provide information to the user. Unfortunately, existing smart glasses solutions are ill-suited for everyday wear. Most smart glasses have short run-times (<1 hr) and may have battery weight and heat dissipation issues that are uncomfortable for continuous wear.

Typically, wearable technologies ("wearables") are worn on the body, or next to the skin, for long periods of time. Additionally, most wearables are used for an entire day (or more) without charging. In other words, commercially successful wearables prioritize user comfort and convenience. While smart glasses have the potential for incredible utility, existing implementations have struggled to satisfy basic usability considerations.

DETAILED DESCRIPTION

Figure 1:
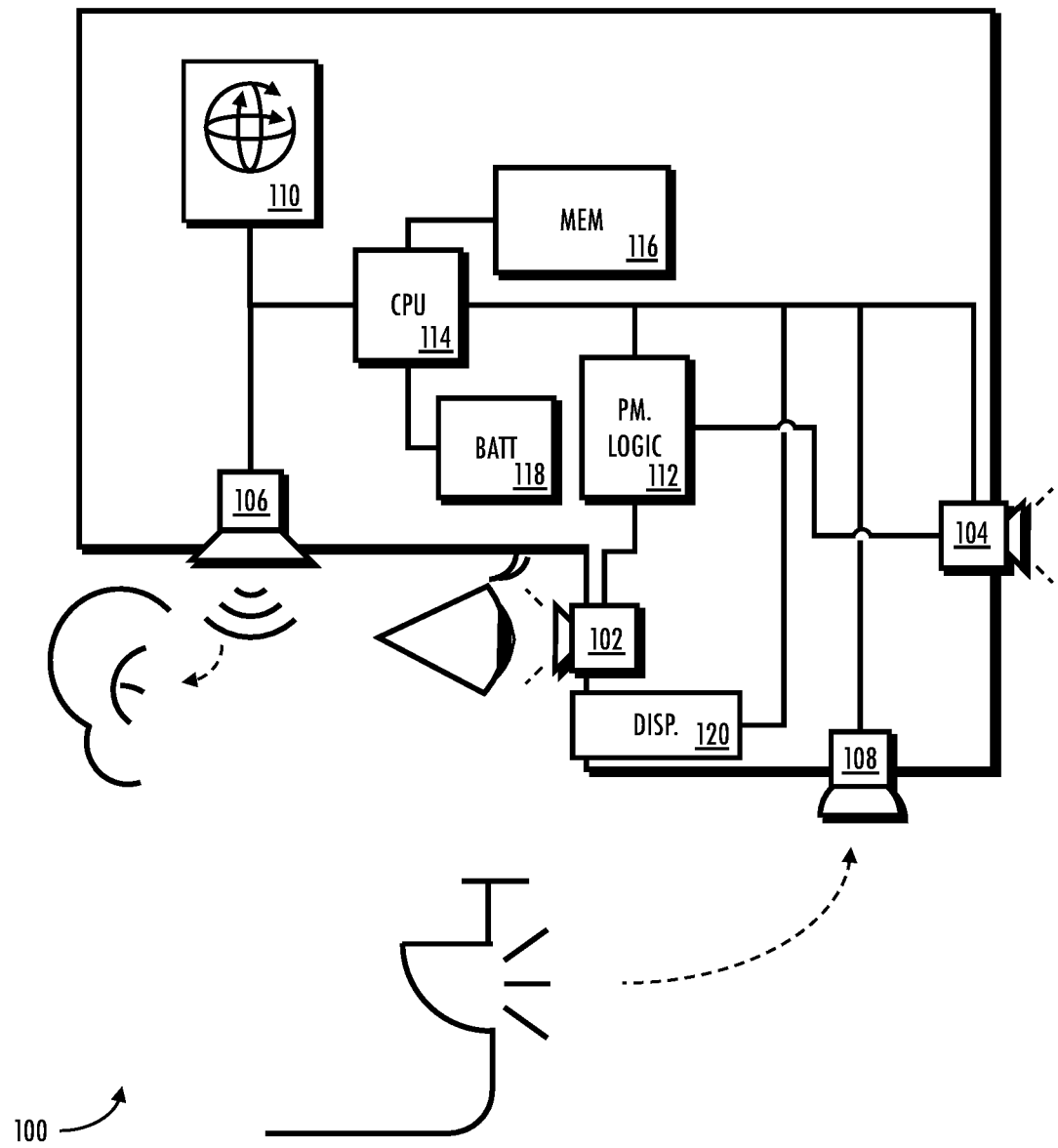
FIG. 1 is a graphical representation of exemplary smart glasses, useful in accordance with the various aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Practical Considerations for Smart Glasses

Smart glasses are an emerging technology that is only starting to become commercialized. At this time, most smart glasses re-purpose commodity components. Unfortunately, existing image capture and display components are often optimized for handheld camera and computer monitor applications. These applications are primarily focused on generating visual media for human consumption, e.g., multimedia applications that rely on large image formats and/or vibrant colors. For example, a modern smart phone might include a few cameras with the following image capture capabilities (summarized in Table 1, below):

TABLE 1

Exemplary Camera Characteristics

| Resolution | F-stop | Aperture, Type | Sensor Size | Pixel Size | FOV |
|---|---|---|---|---|---|
| 108 MPixels | F/1.8 | 24 mm (wide) | 1/1.33" | 0.8 μm | 83° |
| 10 MPixels | F/4.9 | 240 mm (periscope) | 1/3.24" | 1.22 μm | 10° |
| 10 MPixels | F/2.4 | 72 mm (telephoto) | 1/3.24" | 1.22 μm | 35° |
| 10 MPixels | F/2.2 | 13 mm (ultrawide) | 1/2.55" | 1.4 μm | 120° |

While resolution is important, the amount of light that is captured determines a camera's exposure balance, dynamic range, and sharpness. The ability of a camera to capture photons is directly proportional to the camera sensor size, quantum efficiency (QE), and aperture. In other words, a large sensor can capture more light than a smaller sensor for the same shutter speed, ISO (exposure sensitivity) and aperture. While it is possible to compensate for smaller sensor size, these techniques often introduce artifacts and noise.

Mathematically, the image size produced by a lens for a field-of-view (FOV) is directly proportional to its focal length. As a practical matter, however, many different physical parameters affect the ability of a camera to resolve an image and/or the subsequent image quality. Consider, for example, a digital camera that uses a 1/1.8" CMOS sensor could adjust its focal length to provide the same image size as a 35 mm film camera shooting with a 50 mm lens (50 mm/4.73=10.6 mm). If both cameras have the same aperture (e.g., F:2.8), then the aperture is 17.9 mm for the film camera (50 mm/F:2.8) and 3.8 mm for the digital camera (10.6 mm/F:2.8). The larger aperture of the film camera lets in 4.73² or ~22.4× more photons through. As a result, the film camera could be almost 4.5 stops (2^4.5=22.6) more sensitive to light than the digital camera. In other words, the film camera would have the about the same signal-to-noise ratio (SNR) at ISO 1600 compared to the digital camera at ISO 100.

Notably, raw image quality cannot be improved with signal processing; in other words, signal information can only be preserved through the processing pipeline—it cannot be increased. There are some well-known "tricks" to mask noise with visual artifacts that are ignored by humans (and may even be desirable). Nonetheless, introduced noise cannot be used to boost signal information. For example, increasing exposure time can introduce motion blur from camera shake and object movement; motion blur reduces image sharpness regardless of the sensor's resolution. Also, wider aperture lenses are harder to build without introducing lens distortion artifacts or altering the field of view.

The practical limitations of a camera's form factor can greatly affect image clarity. For reference, most smart phone sensors are 4-5× smaller relative to a DSLR handheld camera sensor. Anecdotally, handheld DSLR cameras (16 MPixels) continue to capture objectively better image quality than a smart phone (108 Mpixels). In fact, even the best smart phone cameras may struggle to provide enough image clarity (rendered on a 6.2-inch screen) to resolve half-inch letters at fifteen feet. These physical form factor limitations are even more constrained for smart glasses, which are expected to be smaller in size (both camera and display dimensions).

Weight, battery capacity, and thermal dissipation are also practical considerations that are very important for smart glasses. To provide augmented reality (AR) and/or extended reality (XR) within an eye glass form factor, most proposed implementations incorporate both camera and display technology. Unfortunately, image data is represented as a two-dimensional (2D) array of pixels, so conventional image processing scales quadratically based on image resolution (i.e., an image that is 2× wide and 2× deep, takes 4× processing time—this is also referred to as having $O(n^2)$ complexity). Processing complexity directly corresponds to memory size, power consumption, and heat dissipation. To meet these demands, most smart glasses have large battery components and/or very short image processing run-times (distinct from standby modes or other non-visual modes). As a relative benchmark, one existing smart glass implementation has an average power consumption of ~2.9 W for 3.3 seconds to capture an image (less than 800 high quality images on a single charge), video recording uses a substantially lower image resolution and provides only <45 min of run-time. Additionally, heat dissipation is a major design consideration. Since smart glasses are worn directly on sensitive skin, running "hot" is immediately noticed and highly undesirable.

As previously noted, existing smart glasses may re-use commodity components. Here, the term "commodity" refers to a good, service, etc. that is fungible (interchangeable) with other goods/services of the same market segment. Commodity goods and services compete based on price, rather than brand recognition, functionality, power consumption, performance, or other differentiable features. In other words, commodity components provide a stable ratio of price to e.g., performance, power consumption, etc. Unfortunately, commodity components are also typically pre-packaged in application specific integrated circuits (ASICs) that are generically suitable for many different applications. For example, a smart glasses implementation might have different ASICs for the camera sensors, image signal processor (ISP), central processing unit (CPU), neural network processor (NPU), memory, etc. that are connected via I/O pads and wiring. Moving data off-silicon and onto wiring is extremely inefficient; each I/O transfer may need tens or even hundreds of milliwatts during the transfer time. For video processing, this is a substantial consideration that further exacerbates the battery capacity and thermal issues.

Most people are accustomed to special purpose eyewear (e.g., many people wear corrective lenses and/or sunglasses). Yet smart glasses have failed to provide the benefits and convenience that would allow for widespread adoption. Market research suggests that smart glasses must provide substantial utility over the course of a day in a convenient and comfortable manner. Given modern battery technologies, this limits the average power consumption of smart glasses to only a few milliwatts an hour between recharges (intermittent peak usage may be much higher).

Conversational Human Gestures

Humans are social animals and have developed a variety of different modes of communication to augment speech. Many physical gestures have become part of the conversational lexicon; for example, a "thumbs up" can indicate approval, a "thumbs down" can indicate disapproval, "blowing a kiss" can indicate affection, etc. Notably, however, gestures are often user and/or culture specific. A "thumbs up" gesture could be made with the knuckles of the hand pointed forward, or to the side (across the chest); both styles are commonly understood, yet people often subconsciously prefer one or the other according to their own idiosyncrasies. As but another such example, nodding the head up-and-down indicates "yes" whereas nodding side-to-side indicates "no" in most Western cultures. However, certain East Asian and/or Indian cultures may have a side-to-side nodding that indicates conversational agreement.

As used herein, the term "gesture" and its linguistic derivatives refer to a physical bodily motion (of a human) that communicates information. Gestures are typically made, either in place of, or in conjunction with, verbal communication (speech). Gestures may include movement of the fingers, hands, eyes, eyelids, mouth, lips, tongue, and/or other parts of the body.

Historically, gesture-based communication with consumer electronics has been focused on a touchscreen interface. For example, U.S. Pat. No. 8,665,225, filed Jun. 30, 2008 and entitled "PORTABLE MULTIFUNCTION DEVICE, METHOD, AND GRAPHICAL USER INTERFACE FOR INTERPRETING A FINGER GESTURE", describes a touchscreen user interface that recognizes and/or uses differences between finger tap gestures and finger swipe gestures to make a device respond more efficiently. Notably, the physical touchscreen interface can only register touch(es) within a two-dimensional (2D) area of fixed size.

More recently, some attempts have been made to virtualize gestures within a three-dimensional (3D) space for smart glasses. For example, U.S. Pat. No. 11,340,756, filed Sep. 23, 2020 and entitled "DEVICES, METHODS, AND GRAPHICAL USER INTERFACES FOR INTERACTING WITH THREE-DIMENSIONAL ENVIRONMENTS", describes using "micro-gestures" to interact with a 3D environment without physical input equipment. Such gesture-based solutions focus, and rely on, complex interactions between cameras, computer vision processing, and displays. For example, discerning between different micro-gestures requires both high resolution camera capabilities and complex computer vision to identify "predefined configurations" of the hands. Additionally, visual displays provide a continuous operation context and is displayed to the user as a persistent "mixed reality environment".

Conceptually, computer interfaces have been designed over very basic, unambiguous input/output modalities (e.g., physical buttons, keys, etc.). Human-computer interactions favor explicit data entry. Additionally, most consumer electronics are handheld and have only limited sensor data from the environment—in most cases, the sensed data is placed into a usable context by the user (e.g., a user takes a picture of another person, and explicitly labels the person in the picture).

Within the following discussion, the terms "explicit" and its linguistic derivatives refer to user interactions that are unambiguous e.g., due to a physical state, physical contact, etc. For example, button presses, mouse clicks, keystrokes, etc. explicitly set an ON/OFF state. In fact, even touch-based gestures on a touchscreen interface are detected through the physical resistance/capacitance changes to the touchscreen elements. In contrast, the terms "implicit" and its linguistic derivatives refer to user interactions that are conveyed in an ambiguous manner. For example, a user that "swipes" their hand may be ambiguous as to whether the swipe was intended, or incidental (e.g., brushing away a mosquito). Notably, humans frequently infer the meaning of hand gestures in normal conversation by sensing their surroundings and interpreting/ignoring gestures within the conversational context.

Augmented Reality/Extended Reality Gesture-Based User Experience

Conceptually, eyewear has multiple salient distinctions over other personal effects; by extension, these distinctions may be leveraged by smart glasses in much more intuitive ways compared to other handheld devices and wearables. Firstly, eyewear is worn on the head whereas most other devices may be used with any arbitrary orientation relative to the user's body. For example, a user may switch hands to hold their phone or place it on a table during use. In contrast, once donned, handling eyewear of any kind is generally undesirable (e.g., to avoid scratches and/or smudging). Additionally, eyewear is consistently worn in a physically precise location relative to the user's face e.g., eyes, ears, and mouth. Head movement is also generally much more stable and deliberate relative to other body motion, even during strenuous activity. Hand-eye coordination and proprioception are also basic physical skills that most capable adults possess. For example, many people can instinctively "point at a target" with great accuracy by aligning their outstretched index finger and their dominant eye to the target.

As an important tangent, head movement (and eye-movement, in particular) is highly indicative of attention, regardless of task or motion. Current vision research suggests that eye movement is closely tied to the human thought processes; and, by extension, human thoughts may be inferred from eye movement.

Notably, humans do not have a fluid "gaze"-instead, the human visual system (eyes and brain) constantly scans the visual field to build a mental, three-dimensional "map" of the environment. The retina of the human eye is an incredibly dense nerve tissue; in fact, that the retina does not have blood vessels and relies on diffusion to provide the nerves oxygen and nutrients. Limitations on diffusion distances result in a very small area of high acuity; only about 1-2 degrees of the visual field can be used to resolve objects. During the scanning process, the human eyes move very quickly with abrupt starts and stops ("saccadic movements"). A "saccade" (or saccadic movement) is a quick, simultaneous movement of the eyes between phases of "fixation". Fixation refers to voluntary control of a fixed gaze on a single point. Saccadic movement allows the human brain to piece together small pieces of visual information (e.g., less than 1-2 degrees of visual field) into a much higher resolution image. In other words, the saccadic movements enable the brain to efficiently work around the limitations of the retina.

Microsaccades are small, jerk-like, involuntary eye movements that typically occur during fixation. Research suggests that microsaccades may correct displacements in eye position produced by drifts, and/or prevent the retinal image from fading. Empirically, microsaccade amplitudes vary from 2 to 120 arcminutes. While saccades can be captured with sampling frequencies as low as 10 Hz, microsaccades are much faster and require sampling frequencies no less than 120 Hz. For the purposes of the present disclosure, a gaze is "fixed" (fixation) when eye movement is below a threshold amplitude (e.g., <120 arcminutes or 2 degrees of movement) for longer than a threshold time (e.g., 1 second). In other words, the threshold amplitude and threshold time may be used to adjust the sensitivity of fixation detection to ignore microsaccade movements (which are unrelated to user interest).

As previously alluded to, some attempts have been made to implement augmented reality (AR)/extended reality (XR) user interface processing with smart glasses. Typically, such implementations present augmented information associated with physical objects. For example, smart glasses may be configured to render virtual keyboards and virtual pointing devices and recognize hand-based interactions with the real environment and/or virtualized devices. A user may "type" on a virtualized keyboard to annotate notes about an object in the real world. Under the present smart glasses' paradigm, these user interfaces reuse techniques that are ill-suited for wearable applications. Rendering a persistent ("always-on") mixed reality to immerse the user within the user interface requires high resolution cameras and/or display components that quadratically scale ($O(n^2)$) relative to resolution and display.

The disclosed solution provides a system and method for low-power image processing via the use of scalable processing. The disclosed solution utilizes a plurality of processors, each having customized processing capabilities that are configured to provide efficient, effective processing of triggering gestures, basic hand gestures, advanced hand gestures, finger gestures, voice commands, or a combination thereof. Further, the disclosed solution provides users with the capability to interact with virtual as well as real-world objects. Such interactions may be utilized as inputs to applications, which may be accessible on an associated electronic device (e.g., a smartphone) or directly via the Internet (e.g., social networking websites that are directly accessible by the smart glasses).

More directly, various embodiments of the present disclosure subdivide gesture detection into multiple stages. Each stage conditionally enables subsequent stages for more complex processing. By scaling processing complexity at each stage, high complexity processing can be performed on an "as-needed" basis (only standby resources are "always-on"). For example, rather than using conventional "pixel-by-pixel" computer vision-based algorithms within a processor, machine learning and sensor technologies are combined to provide gesture detection based on neural network activations at the sensor components—in this manner, image data is not transferred across the system bus until a "context" has been determined. Avoiding unnecessary data transfers across a system bus further reduces power requirements. Notably, unlike existing solutions that focus on rendering a persistent "mixed reality environment" for the user to interact with, the exemplary embodiments detect user interactions (e.g., visual fixation, hand movements) relative to physical/virtualized objects (context) before enabling compute-intensive augmented reality (AR)/extended reality (XR) user interface processing. More generally, the techniques described throughout may be broadly extended to any staged complexity processing for gesture-based user interfaces. For example, low-power forward-facing cameras may be used to detect salient user interactions (a "wake-up" user interaction) before enabling a more fully-featured gesture-based user interface.

Here, the term "context" broadly refers to a specific collection of circumstances, events, device data, and/or user interactions; context may include spatial information, temporal information, and/or user interaction data. For the purposes of the following discussion, the term "user interaction" refers to a specific arrangement or relative motion of the user's eyes, mouth, head, and limbs. User interactions, along with related context (if any), form a user interface instruction (a "gesture"). While the following examples demonstrate gestures in a spatial context (e.g., a user interaction made with respect to the user's physical surroundings or virtual objects), temporal contexts, conversational contexts, and/or any other such combinations may be substituted with equal success. For instance, a user may chain several gestures over time (temporal context) that affect the successive interpretations of the gestures (conversational context).

Example Operation, Hands-Free Picture

FIG. 1 depicts a graphical representation 100 of exemplary smart glasses useful in accordance with the various aspects of the present disclosure. As shown, the smart glasses include an eye-tracking camera 102, a forward-facing camera 104, speakers 106, microphone 108, an inertial measurement unit (IMU 110), scalable power management logic 112, central processing unit (CPU 114), memory 116, battery 118, and display 120.

In the illustrated example, the scalable power management logic 112 is illustrated as a discrete logical component, however it may also be distributed and/or subsumed within the eye-tracking camera 102, the forward-facing camera 104, the CPU 114, or any other component. The scalable power management logic 112 incorporates the state machines and/or conditional logic used to wake different stages of processing. In other words, the scalable power management logic 112 ensures that different conditional requirements are met for each stage of operation, before triggering the next stage. For example, the scalable power management logic 112 may verify that a gaze is held on a specific object for a specific threshold of time, before inferring the presence of user attention (a first user interaction). As a practical matter, the scalable power management logic 112 may receive the results obtained from other logic (rather than raw data) to reduce unnecessary data transfers and associated wire transfer costs.

During normal operation, most components (e.g., CPU 114, forward-facing camera 104, display 120, etc.) are kept powered-off or in low-power/sleep modes until needed. The eye-tracking camera 102 and trigger logic 112 operate in a reduced-power monitoring mode. The reduced-power monitoring mode may reduce the frequency, color, and/or resolution of eye-tracking image captures. For example, an eye-tracking camera 102 with capture capabilities up to 120 Hz (Hertz or frames per second (fps)) may operate at less than 10 Hz. Additionally, in some variants, only the raw light intensity may be monitored (color processing may not be necessary to approximate the location of a dark pupil against white sclera). The estimated power consumption for this stage of operation may be a few microwatts, and would likely to correspond to 70% of smart glasses operation (<1 mWh for realistic usage over 10 hours of activity).

When a user notices something of interest, the eye-tracking camera 102 registers eye movement activity below a threshold amplitude (e.g., gaze fixation). In some cases, the eye-tracking camera 102 may progressively increase its frequency, color, and/or resolution to fine tune gaze point information and ensure that only saccadic/microsaccadic movement is consistent with fixation. If fixation occurs for a threshold duration, then trigger logic 112 wakes the forward-facing camera 104 for forward-facing capture. In some variants, the eye-tracking data/gaze point is also provided to the forward-facing camera 104. The estimated power consumption for this stage of operation may be between 100-200 microwatts, and would likely to correspond to 20% of smart glasses operation (<1 mWh for realistic usage over 10 hours of activity).

During the forward-facing capture stage, the forward-facing camera 104 captures light with the full array of photosites but may only read binned pixels (e.g., grouping pixels in sets of 9, for a 108 Mpixel sensor, to get a 12 MPixel "nona-binned" or "9-binned" resolution.). The forward-facing camera 104 may include in-sensor machine learning (ML), or use off-sensor ML components of the system. In one specific in-sensor implementation, the forward-facing camera 104 may include machine learning (ML) logic for object recognition as either the same silicon die, or in a stacked die (same package/module). In one specific variant, the ML logic may be calibrated to identify the location and movement of user-specific hands (e.g., size, complexion, orientation, etc.). Calibrating the machine learning logic to recognize the user's hands (and gestures) can greatly improve both robustness and accuracy. For example, the ML logic does not need to recognize any arbitrarily sized hand in any orientation, instead it can limit its search (and false positive/negative rejection) to just shapes and colors approximating the user's own hands and complexion. User-specific training also improves performance for cultural and idiosyncratic mannerisms of the user. While the foregoing example is based on visual training, other modalities may be substituted with equal success. For example, an audible variant may train the neural network to recognize certain audible keywords. Similarly, a haptic variant may train the neural network to recognize certain head motions/positions.

If one or more hands are present (a second user interaction), then the forward-facing camera 104 attempts to match the gaze point information to corresponding features in the binned resolution image. In one specific implementation, the gaze point information may be used to identify a region of interest (ROI) e.g., around a person (e.g., facial recognition), landmark, object, landscape, vehicle, etc. Alternatively, if the hand recognition fails to identify any hands, then no gesture is present, and the system can return to low-power eye-tracking. In some cases, the hand recognition process may be re-attempted with e.g., higher resolution imaging, faster sampling frequencies, and/or different exposure settings.

As a brief aside, some implementations (not shown) may use hand recognition in a forward-facing camera in lieu of, or in conjunction with, the eye-tracking camera 102. In such implementations, the forward-facing camera may be a full-resolution camera 104, or a separate low-power/lower-resolution forward-facing camera. Such implementations can capture forward-facing images at a much slower frame rate than video (e.g., 2 Hz, 4 Hz, 8 Hz, etc.). If hands are not detected in the visual field, then no user interaction is present, and the forward-facing camera can go to sleep until the next capture interval. Once hands are present, then the low-power/resolution forward-facing camera can increase frame rate to determine the nature of the user interaction, etc. More directly, presence detection of hands can be made with very slow frame rates and much lower resolutions. These implementations would be comparable to the aforementioned eye-tracking implementation, i.e., the estimated power consumption for this stage of operation could be only a few microwatts, and would likely to correspond to 70% of smart glasses operation (<1 mWh for realistic usage over 10 hours of activity).

Referring back to the illustrated example of FIG. 1, the ROI image and the location and movement information for the hand(s) are processed in a neural network that is trained to recognize gestures from user interactions. In one embodiment, the neural network logic may be locally present (e.g., in-sensor) in the forward-facing camera. If a valid user gesture is present, then the neural network logic reports the activity to the trigger logic 112, responsively the trigger logic wakes the CPU 114 and reports the detected neural network activations, ROI, and/or any other relevant information. The estimated power consumption for this stage of operation may be between 1-2 milliwatts, and would likely to correspond to 7% of smart glasses operation (~1.5 mWh for realistic usage over 10 hours of activity).

Once the CPU 114 is awakened, it determines the desired gesture and related context from the neural network activations and ROI. In some cases, the CPU 114 may request supplemental image data. Once the CPU 114 has determined the desired gesture, the necessary subsystems are enabled for gesture-specific processing. Gesture-specific processing may include e.g. verbal input via microphone 108, audible feedback via speaker 106, visual feedback (via the eye-tracking camera 102, the forward-facing camera 104, and/or the display 120), and/or motion data via the IMU 110. The estimated power consumption for this stage of operation may be between 2-5 milliwatts, and would likely to correspond to 3% of smart glasses operation (~1.5 mWh for realistic usage over 10 hours of activity).

Figure 2:
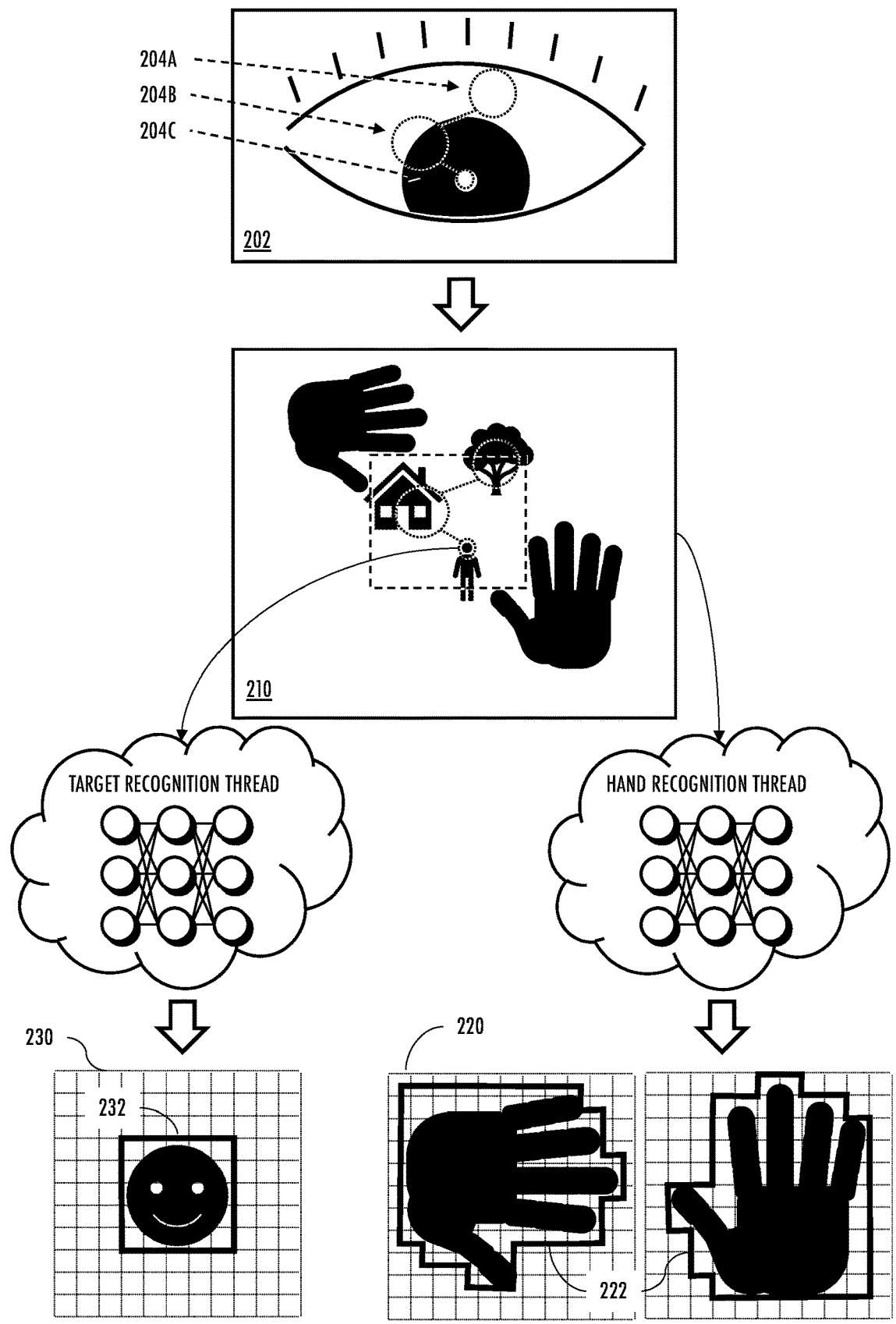
FIG. 2 depicts a hands-free user interaction, useful to demonstrate various aspects of the present disclosure.

Consider the following hands-free user interaction 200 depicted in FIG. 2. Here, the eye-tracking camera 102 captures eye-tracking images 202. The eye-tracking history includes two saccades between three fixation points 204A, 204B, 204C. Fixation point 204C is held steady for the threshold duration—the trigger logic 112 wakes the forward-facing camera 104 to perform the next stage of operation (forward-facing capture).

The forward-facing camera 104 captures the user's visual field 210. In this case, the forward-facing camera 104 captures a binned image to perform preliminary object identification. For example, the user's visual field 210 is checked for either one, or both, of the user's hands (or that any other recognized user interaction may be present)—the identified areas may be cropped to just a gesture area 220. Additionally, the eye-tracking history (including fixation points 204A, 204B, 204C) may be mapped to the user's visual field 210 to determine a target area 230 around the fixation point 204C.

Notably, a gaze point is a point and does not indicate two-dimensional size, thus, the target area 230 may additionally be provided to a machine learning algorithm for target recognition (target recognition thread). The machine learning algorithm has been trained to identify certain types of objects (e.g., faces, hands, shapes, objects, etc.). In this case, the target recognition thread identifies that the area of interest 220 includes facial features and crops the target area 230 to just a target region of interest (target ROI 232). Similarly, the gesture area 220 may be additionally cropped down to just the area of the hands (gesture ROI 222). Transferring cropped image data (ROIs) rather than full image data allows for reduced downstream processing complexity and/or transfer sizes.

In some embodiments, the target ROI (or gesture ROI) may be more efficiently stored/processed as metadata, rather than image data. For example, some camera sensors may have onboard recognition capabilities that can tag the target ROI (or gesture ROI) with metadata. In such variants, the metadata may be used instead of the ROI data. For example, a camera sensor may determine that the user is viewing a car; if the metadata tag contains enough information for subsequent processing, then the captured image data may not be stored at all (metadata might be sufficient to e.g., target ads to the user based on their car preference, etc.).

In another such variant, the metadata may be based on text data printed on a physical object. Consider a scenario where a user can see a street signs, this data may be used to visually record location information (and may be less power than alternatives, e.g., GPS, etc.). In another such variant, text data may be translated from a first language (e.g., Mandarin) into a second language (e.g., French). Translation may use a local library for commonly used words (as may be found on food menus, etc.) to minimize unnecessary network activity to look-up words.

While the illustrated example is presented in the case of a target (e.g., another person), certain user interactions may be part of an internal dialogue between the user and the smart glasses. In some cases, the user interactions may have a target ROI that is also the gesture ROI. For example, a person that wants to "take a note", or "get the time", (see example gestures below) might look at their own hands. As another example, the smart glasses may remind the user of an upcoming appointment—the user may use an American Sign Language (ASL) "L" and "5" to text the other attendee that they'll be "5 minutes late". In these cases, only the gesture ROI is processed to further reduce power consumption. As a related optimization, some user interactions may be so recognizable/frequently used, that the gesture processing may be performed in-sensor and reduced to a metadata annotation to reduce data transfer. As but one such example, "thumbs up" and "thumbs down" user interactions might be suitable for performing in-sensor and returning just one of two enumerated values ("good" or "bad").

Certain user interactions have different meanings in different contexts. Referring back to FIG. 2, the gesture ROI 222 and the target ROI 232 may be checked by the scalable power management logic 112 to ensure that the user interaction and context for the gesture is valid, and that the target is a valid target type. A successfully checked user interaction/context may allow the trigger logic 112 to power-on the systems related to the gesture. For example, the trigger logic 112 may verify that both hands are "framing an image" around the target (and not arbitrarily positioned relative to the gaze point); once checked, the trigger logic 112 may wake up the CPU 114, speaker 106, microphone 108, and/or display 120. Additionally, the front-facing camera 104 may be configured for non-binned operation (full resolution).

In one exemplary embodiment, the final stage of operation may include additional aspects of interactive dialogue between the smart glasses and the user. For example, the user may be notified that the system is ready for operation with an audible prompt (a camera "whir") and visual cues (e.g., an overlaid "frame" that is rotated and cropped according to the hand positioning, etc.). If the user is satisfied, they can trigger the full resolution shot with a verbal confirmation, or a quick eye-blink (without pressing a button). Some variants may also allow for a "focus and hold" i.e., the user can frame the shot but wait for an exact moment to trigger capture—this may enable action footage for cameras with longer trigger delays. Yet other variants may allow the user to build-on gestures within a larger context; for example, once the user has created the "frame" with both hands, one hand can stay in place to "hold" the frame (i.e., a photo capture context), while the other hand provides a visual countdown "3-2-1" (i.e., a gesture that is interpreted within the photo capture context).

More directly, unlike solutions that are focused on capturing the external environment to render a persistent and real-time AR/XR, the exemplary smart glasses attempt to infer the user's internal state of mind from both the user's interactions and the situational context. In the above example, the inferences are made based on eye-tracking and/or hand gestures, but additional modes of input/output may be used with equal success. As previously alluded to, the smart glasses may additionally use audible and/or visual cues to support an ongoing dialogue with the user. This may allow for more precise and clear user interactions.

Additionally, unlike persistent AR/XR environments which can be noisy and distracting, the exemplary smart glasses selectively activate of AR/XR interactions to situations where they make sense to the user. For example, a user walking down a street may not be interested in having indiscriminate advertisements and other noise overlaid on their vision. This is both disruptive and undesirable. However, a user that has expressed interest in a particular venue may be shown targeted advertisements with much higher utility to both the user and the venue (e.g., the user fixes their gaze on a posted menu item, triggering a tantalizing video of the entrée being served and food critic reviews, etc.).

Furthermore, the techniques described above progressively use one-handed, two-handed, and even head movement type user interactions (e.g., IMU data) within a useful context. By subdividing user interface instructions into different stages (and associated processing complexity), the exemplary smart glasses can greatly reduce ongoing processing burden. In some embodiments, the user interactions may be separated into a first set of user interactions and/or a second set of user interactions (gestures with an appropriate context). A first set of user interactions may be as simple as a hand wave in view of the front-facing camera sensor, or gaze fixation (detected by an eye-tracking camera sensor). In the above example, the exemplary smart glasses monitor for user attention first (a first user interaction). Then, once attention is detected, the smart glasses capture binned images of the user's limbs (a second user interaction) and surroundings to determine an appropriate context for the user's attention. Contextual information may include how many hands the user is gesturing with and/or a target that the gesture might be in reference to, etc. After determining the relevant context and/or user interaction(s), the smart glasses trigger a specific gesture-based process that enables the appropriate processing capabilities for the gesture-specific tasks (e.g., augmented displays, full-resolution camera, voice capabilities, etc.). Components that are unnecessary can be left in a sleep state; in other words, the progressive gesture-based AR/XR interface controls both the software user interface, as well as the hardware components to support it.

In some cases, the second set of user interactions may be more elaborate than the first set of user interactions. In some cases, the more comprehensive second set of user interactions may be performed in multiple dimensions (x, y, z), with rotations, and/or varying velocities. The second set of user interactions may be combined to provide a greater vocabulary of gestures and may also be sequentially chained once the system is fully awake. For example, a user may swipe left and right to page through information for a virtual object. As another example, a user may view a landmark and swipe through pages of historical information relating to the landmark. In another example, the user may drag an informational window (as a virtual object) to a new position on the display.

System Architecture

Figure 3:
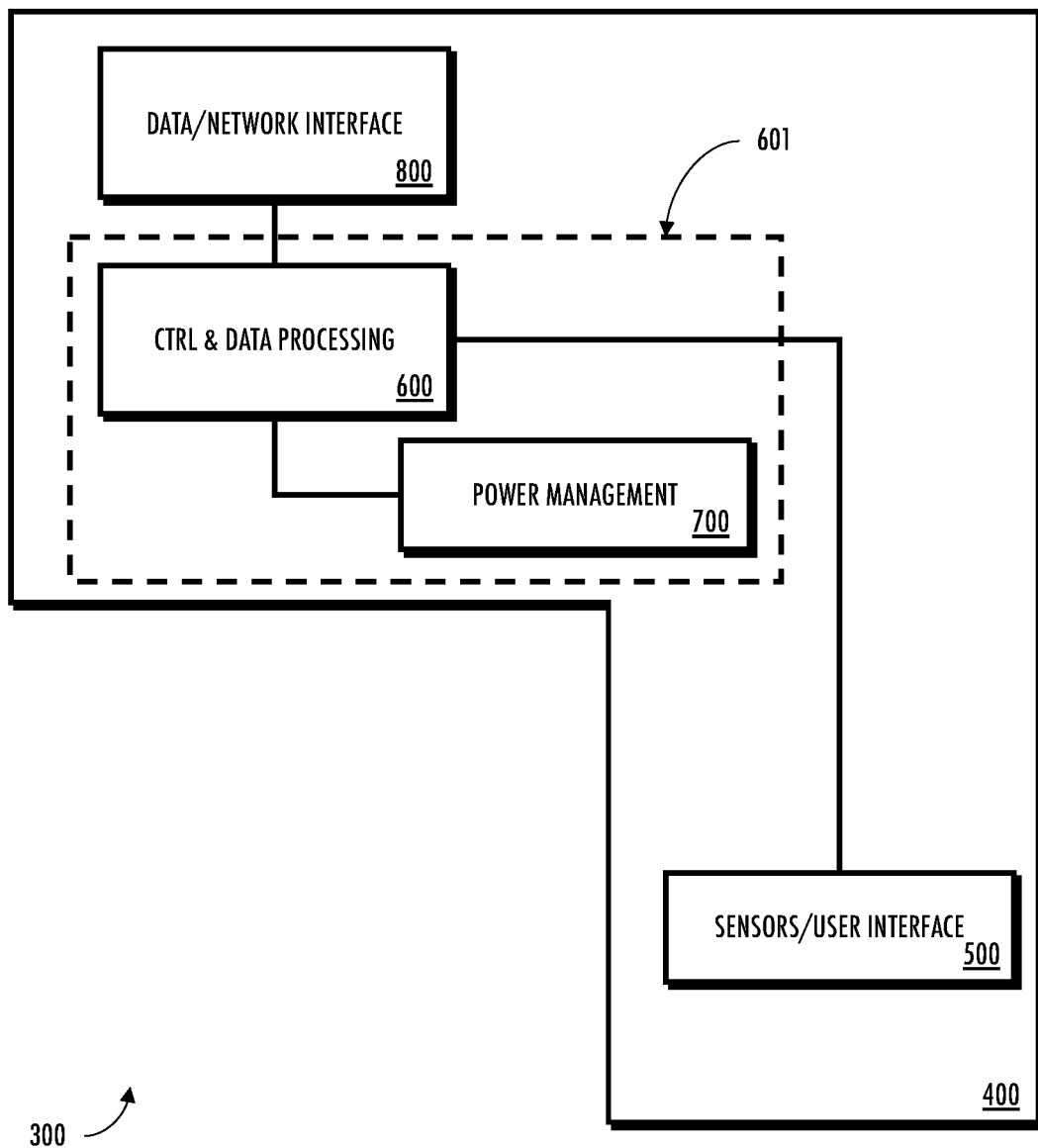
FIG. 3 is a logical block diagram of the exemplary gesture-based augmented reality, extended reality (AR/XR) system.

FIG. 3 is a logical block diagram of the exemplary gesture-based augmented reality, extended reality (AR/XR) system 300. The system 300 includes: a physical frame 400, a sensor/user interface subsystem 500, control and data processing logic 600, a power management subsystem 700, and a data/network interface 800. The physical frame 400 attaches system 300 to the user, enabling either one or both hands to gesture (hands-free operation). The sensor/user interface subsystem 500 monitors the user for user interactions, captures data from the environment, and renders data for user consumption. The control and data processing logic 600 obtains data generated by the user, other devices, and/or captured from the environment, to perform calculations and/or data manipulations. The resulting data may be stored, rendered to the user, transmitted to another party, or otherwise used by the system to carry out its tasks. The power management subsystem 700 supplies and controls power for the system components. Functionally, the control and data processing logic 600 and power management subsystem 700 are combined to create a gesture-driven scalable processing subsystem 601. The data/network logic 800 converts data for transmission to another device via removeable storage media or some other transmission medium.

The various logical subsystems described above may be logically combined, divided, hybridized, and/or augmented within various physical components of a device. As but one such example, an eye-tracking camera and forward-facing camera may be implemented as separate, or combined, physical assemblies. As another example, power management may be centralized within a single component or distributed among many different components; similarly, data processing logic may occur in multiple components of the system. More generally, the logical block diagram illustrates the various functional components of the system, which may be physically implemented in a variety of different manners.

While the present discussion describes an AR/XR user interface for smart glasses, the system may have broad applicability to any gesture-based user interface. Such applications may include stationary and/or mobile applications. For example, gesture-based user interfaces may allow for hands-free navigation of stationary workstations and/or kiosks. As another example, a drone may capture images to perform complex navigation without incurring heavy power penalties for doing so. Such a use case is important for flight of drones since battery power is generally scarce. Other useful applications may include IoT and/or low-power mesh networking applications. For example, smart doorbells require battery power to operate a camera (and associated image processing). If the processing consumes too much power, the smart doorbell cannot function for basic operation (e.g., ringing the user in the building). Therefore, the disclosed solution provides solutions for use cases in smart doorbells (and other low power devices such as thermostats). Given the need to recognize humans, and more specifically human faces, the smart doorbell is improved because advanced processing may perform analysis to detect familiar and unfamiliar visitors to provide safety to occupants of the building. More broadly speaking, the techniques described conserve resources for handling the user's attentive interactions, thus maximizing useful life.

Additionally, while AR/XR interfaces primarily use display components to display a combination of real and virtual data, other interface components may enable voice commands, audible signaling, haptic interfaces, inertial measurements, and/or "rumble box" type signaling. More generally, the techniques described throughout are applicable to any sensory modality.

The following discussion provides functional descriptions for each of the logical entities of the exemplary system. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 300 is separately provided below.

Functional Overview of the Physical Frame

A "physical frame" or a "frame" refers to any physical structure or combination of structures that holds the components of a gesture-based AR/XR system 300 within a fixed location relative to the user's head. While the present disclosure is described in the context of eyewear frames, artisans of ordinary skill in the related arts will readily appreciate that the techniques may be extended to any form of headwear including without limitation: hats, visors, helmets, goggles, and/or headsets. In fact, a physical frame may not hold the user's head at all; the frame may be based on a relatively fixed head positioning determined from a known body position and/or intended use scenario—for example, a heads-up display in a smart car may be trained for the driver's head positioning (or passenger's positioning) to allow for gesture-based user interfaces e.g., during hands-free operation, etc.

As used herein, the term "hands-free" refers to operation of the system without requiring physical contact between the frame and its components, and the user's hands. Examples of physical contact (which are unnecessary during hands-free operation) may include e.g., button presses, physical taps, capacitive sensing, etc.

Physical Frame, Implementation and Design Considerations

Figure 4:
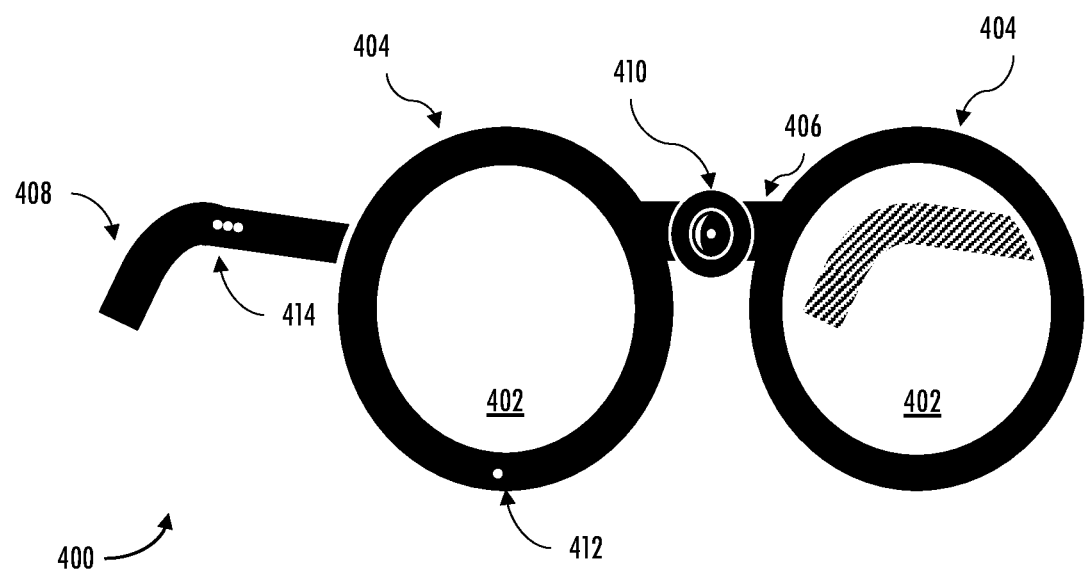
FIG. 4 is a graphical representation of a physical frame, useful in accordance with the various aspects of the present disclosure.

As shown in FIG. 4, the physical frame 400 may be implemented as eyeglass frames that include one or more lenses 402 housed in rims 404 that are connected by a bridge 406. The frame 400 rests on the user's nose, and two arms 408 rest on the user's ears. The frame may hold the various operational components of the smart glasses (e.g., camera(s) 410, microphone(s) 412, and speaker(s) 414) in fixed locations relative to the user's sense/vocal organs (eyes, ears, mouth).

Physical frames may be manufactured in a variety of frame types, materials, and/or shapes. Common frame types include full-rimmed, semi-rimless, rimless, wire, and/or custom bridge (low bridge, high bridge). Full-rimmed glasses have rims that cover the full circumference of the lenses, semi-rimmed have some portion of the lens that expose an edge of the lenses, and rimless/wire glasses do not have any rim around the lenses. Some humans have differently shaped facial features; typically, custom bridge frames are designed to prevent glasses from slipping down certain types of noses. Common frame materials include plastic, acetate, wood, and metals (aluminum, stainless steel, titanium, silver, gold, etc.), and/or combinations of the foregoing. Common shapes include rectangle, oval, round, square, large, horn, brow-line, aviator, cat-eye, oversized and/or geometric shapes.

Larger and more substantial frames and materials may provide stability and/or support for mounting the various components of the system. For example, full-rimmed glasses may support a forward-facing and eye-tracking camera as well as speakers and/or microphone components, etc. Semi-rimmed and rimless/wire form factors may be lighter and/or more comfortable but may limit the capabilities of the glasses—e.g., only a limited resolution forward-facing camera to capture user hand gestures, etc. Similarly, custom bridge frames may provide more stability near the nose; this may be desirable for e.g., a more robust forward-facing camera. Material selection and/or frame types may also have functional considerations for smart glass operation; for example, plastics and woods are insulators and can manage thermal heat well, whereas metals may offer a higher strength to weight ratio. In some implementations, the scalable power management may consider frame materials and/or construction may be used to adjust the frequency and/or duration of different power modes. As one such example, plastic frames may permit for longer active usage, compared to metal frames. Furthermore, frame shape can affect the user's visual field; certain shapes (e.g., oversize and/or aviator) may permit a broader unobstructed visual field than others (e.g., rectangle, cat-eye); in some cases, this may affect the effective visual range used by the other components of the system, etc.

Conceptually, various embodiments of the present disclosure scale the capabilities of a gesture-based AR/XR user interface according to "wearable" considerations. As a practical matter, these considerations may include acceptable thermal dissipation, battery life, sensor weight, and visual field. Some physical frame effects may be implicitly selected—for by the user. For example, even though customers often consider the physical frame to be a matter of personal style, the new capabilities described throughout may enable active functions that affect a user's experience; in some cases, this may influence the customer to make different selections compared to their non-smart eyewear or to purchase multiple different smart glasses for different usages. Other physical frame effects may be adjusted based on user-to-frame metadata. In some cases, the user-to-frame metadata may be generated from user-specific calibration, training, and/or user configuration—in some cases, the user-to-frame metadata may be stored in data structures or "profiles". User-to-frame profiles may be useful to e.g., migrate training between different physical frames, ensure consistent usage experience across different frames, etc.

Functional Overview of the Sensor/User Interface Subsystem

A "sensor" refers to any electrical and/or mechanical structure that measures, and records, parameters of the physical environment as analog or digital data. Most consumer electronics devices incorporate multiple different modalities of sensor data; for example, visual data may be captured as images and/or video, audible data may be captured as audio waveforms (or their frequency representations), inertial measurements may be captured as quaternions, Euler angles, or other coordinate-based representations.

Various embodiments of the present disclosure integrate aspects of the user interface with the sensor subsystem. Here, the "user interface" refers to the physical and logical components of the system that interact with the human user. A "physical" user interface refers to electrical and/or mechanical devices that the user physically interacts with. An "augmented reality" user interface refers to a user interface that incorporates an artificial environment that has been overlaid on the user's physical environment. A "virtual reality" user interface refers to a user interface that is entirely constrained within a "virtualized" artificial environment. An "extended reality" user interface refers to any user interface that lies in the spectrum from physical user interfaces to virtual user interfaces.

Most user interfaces require that a user explicitly interact with physical or virtual object (e.g., pressing a physical or virtual button, sliding a finger across a screen). In contrast, some (but not all) gesture-based user instructions described below sense the user interaction without reference to an object (without a physical or virtual button/screen, etc.).

While the present disclosure is described in the context of audio data, visual data, and/or IMU data, artisans of ordinary skill in the related arts will readily appreciate that the raw data, metadata, and/or any derived data may be substituted with equal success. For example, an image may be provided along with metadata about the image (e.g., facial coordinates, object coordinates, depth maps, etc.). Post-processing may also yield derived data from raw image data; for example, a neural network may process an image and derive one or more activations (data packets that identify a location of a "spike" activation within the neural network).

Sensor/User Interface, Implementation and Design Considerations

Figure 5:
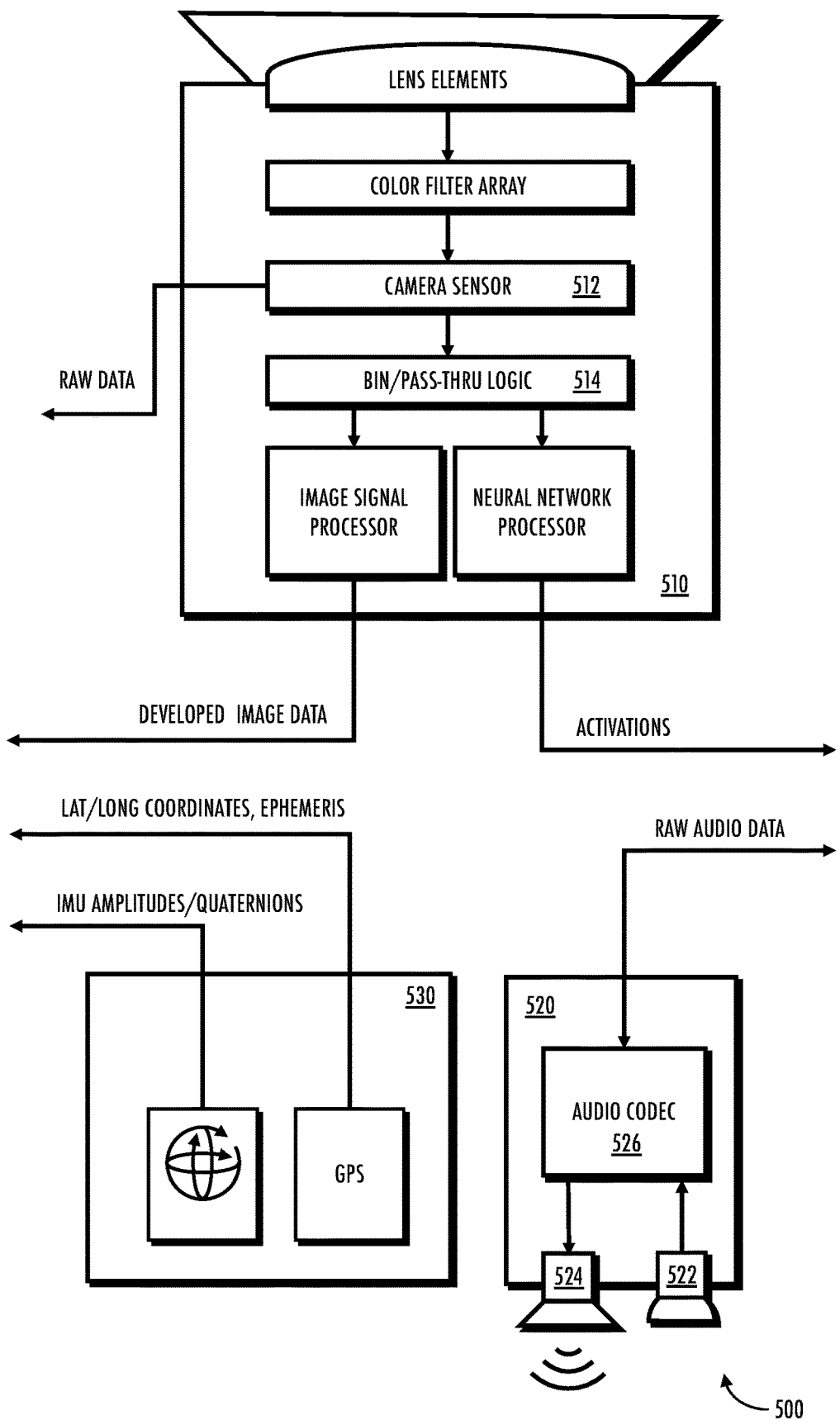
FIG. 5 is a logical block diagram of the sensor/user interface subsystem.

FIG. 5 is a logical block diagram of the various sensors of the sensor/user interface subsystem 500. The sensor/user interface subsystem 500 may include: one or more camera sensor(s) 510, an audio module 520, an accelerometer/gyroscope/magnetometer 530 (also referred to as an inertial measurement unit (IMU)), a display module (not shown), and/or Global Positioning System (GPS) system (not shown). In some embodiments, the sensor/user interface subsystem 500 is an integral part of the system 300. In other embodiments, the sensor/user interface subsystem 500 may be augmented by external devices and/or removably attached components (e.g., smart phones, after market sensors, etc.). The following sections provide detailed descriptions of the individual components of the sensor/user interface subsystem 500.

Camera Module

A camera lens bends (distorts) light to focus on the camera sensor 512. In one specific implementation, the camera sensor 512 senses light (luminance) via photoelectric sensors (e.g., photosites). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image. Notably, most imaging formats are defined for the human visual spectrum; however, machine vision may use other variants of light. For example, a computer vision camera might operate on direct raw data from the image sensor with a RCCC (Red Clear Clear Clear) color filter array that provides a higher light intensity than the RGB color filter array used in media application cameras.

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning" (see bin/pass-thru logic 514). Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

During operation, the system may make use of multiple camera systems to assess user interactions and the physical environment. In one exemplary embodiment, the smart glasses may have one or more forward-facing cameras to capture the user's visual field. In some cases, multiple forward-facing cameras can be used to capture different fields-of-view and/or ranges. For example, a medium range camera might have a horizontal field of view (FOV) of 70°-120° whereas long range cameras may use a FOV of approximately 35° and have multiple aperture settings. In some cases, a "wide" FOV camera (so-called fisheye lenses provide between 120° and 195° may be used to capture periphery information.

In some embodiments, a rear-facing "eye-tracking" camera may be used to monitor gaze fixation (a user interaction event) by tracking saccadic or microsaccadic eye movements. Eye-tracking embodiments may greatly simplify camera operation since the eye-tracking data is primarily captured for standby operation (discussed below).

While the present discussion describes forward-facing and rear-facing cameras, the techniques are broadly applicable to any outward-facing and inward-facing cameras. As used herein, the term "outward-facing" refers to cameras that capture the surroundings of a user and/or the user's relation relative to the surroundings. For example, a rear outward-facing camera could be used to capture the surroundings behind the user. Such configurations may be useful for gaming applications and/or simultaneous localization and mapping (SLAM-based) applications. As used herein, the term "inward-facing" refers to cameras that capture the user e.g., to infer user interactions, etc.

More generally, however, any camera lens or set of camera lenses may be substituted with equal success for any of the foregoing tasks; including e.g., narrow field-of-view (30° to) 90° and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

In some embodiments, the camera sensor(s) 510 may include on-board image signal processing and/or neural network processing. On-board processing may be implemented within the same silicon or on a stacked silicon die (within the same package/module). Silicon and stacked variants reduce power consumption relative to discrete component alternatives that must be connected via external wiring, etc. Processing functionality is discussed elsewhere (see e.g., Control and Data Subsystem, further below).

Audio Module

The audio module 520 typically incorporates a microphone 522, speaker 524, and an audio codec 526. The microphone senses acoustic vibrations and converts the vibrations to an electrical signal (via a transducer, condenser, etc.). The electrical signal is provided to the audio codec, which samples the electrical signal and converts the time domain waveform to its frequency domain representation. Typically, additional filtering and noise reduction may be performed to compensate for microphone characteristics.

The resulting audio waveform may be compressed for delivery via any number of audio data formats. To generate audible sound, the audio codec 526 obtains audio data and decodes the data into an electrical signal. The electrical signal can be amplified and used to drive the speaker 524 to generate acoustic waves.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.).

While the illustrated audio module 520 depicts a single microphone and speaker, an audio module may have any number of microphones and/or speakers. For example, two speakers may be used to provide stereo sound. Multiple microphones may be used to collect both the user's vocal instructions as well as the environmental sounds. More broadly, any number of individual microphones and/or speakers can be used to constructively and/or destructively combine acoustic waves (also referred to as beamforming).

In some embodiments, the audio module 520 may include on-board audio processing and/or neural network processing to assist with voice analysis and synthesis. These functions are discussed elsewhere (see e.g., Control and Data Subsystem, further below).

Inertial Measurement Unit and Positioning

The inertial measurement unit (IMU) 530 includes one or more accelerometers, gyroscopes, and/or magnetometers. Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both head direction and speed).

More generally, however, any scheme for detecting user velocity (direction and speed) may be substituted with equal success for any of the foregoing tasks. Other useful information may include pedometer and/or compass measurements. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Global Positioning System (GPS) is a satellite-based radio navigation system that allows a user device to triangulate its location anywhere in the world. Each GPS satellite carries very stable atomic clocks that are synchronized with one another and with ground clocks. Any drift from time maintained on the ground is corrected daily. In the same manner, the satellite locations are known with great precision. The satellites continuously broadcast their current position. During operation, GPS receivers attempt to demodulate GPS satellite broadcasts. Since the speed of radio waves is constant and independent of the satellite speed, the time delay between when the satellite transmits a signal and the receiver receives it is proportional to the distance from the satellite to the receiver. Once received, a GPS receiver can triangulate its own four-dimensional position in spacetime based on data received from multiple GPS satellites. At a minimum, four satellites must be in view of the receiver for it to compute four unknown quantities (three position coordinates and the deviation of its own clock from satellite time). In so-called "assisted GPS" implementations, ephemeris data may be downloaded from cellular networks to reduce processing complexity (e.g., the receiver can reduce its search window).

In one exemplary embodiment, GPS and/or route information may be used to identify the geographic area that a user has traveled in and/or will pass through. In some cases, this may allow for better predictions as to the current user context (e.g., at home, at work, at the gym, etc.).

In some embodiments, the IMU 530 may include onboard telemetry processing and/or neural network processing to assist with telemetry analysis and synthesis. These functions are discussed elsewhere (see e.g., Control and Data Subsystem, further below).

Display Module

The display module (not shown) is an output device for presentation of information in a visual form. Different display configurations may internalize or externalize the display components within the lens. For example, some implementations embeds optics or waveguides within the lens and externalizes the display as a nearby projector or micro-LEDs. As another such example, there are systems that project the display into the eyes.

In one exemplary embodiment, the display module may be incorporated within the system as a display that is overlaps the user's visual field. Examples of such implementations may include so-called "heads up displays" (HUDs) that are integrated within the lenses, or projection/reflection type displays that use the lens components as a display area. Existing integrated display sizes are typically limited to the lens form factor, and thus resolutions may be smaller than handheld devices e.g., 640×320, 1280×640, 1980×1280, etc. For comparison, handheld device resolutions that exceed 2560×1280 are not unusual for smart phones, and tablets can often provide 4K UHD (3840×2160) or better. In some embodiments, the display module may be external to the glasses and remotely managed by the system (e.g., screen casting). For example, the smart glasses can encode a video stream that is sent to a user's smart phone or tablet for display.

The display module may be used where the smart glasses present and provide interaction with an AR/XR object. For example, the AR/XR object may be a virtual keyboard and a virtual mouse. During such operation, the user may invoke a command (e.g., a hand gesture) that causes the smart glasses to present the virtual keyboard for typing by the user. The virtual keyboard is provided by presenting images on the smart glasses such that the user may type without contact to a physical object. One of skill in the art will appreciate that the virtual keyboard (and/or mouse) may be displayed as an overlay on a physical object such as a desk such that the user is technically touching a real-world object, that is, however, not a physical keyboard and/or a physical mouse.

Functional Overview of Gesture-Driven Scalable Processing Subsystem

Most embedded and/or mobile devices draw power from a limited battery capacity and/or may be subject to power/thermal constraints. There are a variety of power management schemes that dynamically "scale" power based on use and/or processing; for example, mobile phones will "sleep" to save power, periodically "wake-up" to check for incoming phone calls, and/or change into full-power operation when placing or receiving data. However, existing power management schemes do not scale power to process user interface operations (e.g., the user interface does not change power state to interpret an explicit button press, etc.).

Various aspects of the present disclosure are directed to a gesture-driven scalable processing that enables/adjusts processing and power consumption to infer the meaning of user interactions (without an explicit button press, touchscreen contact, etc.). More directly, the exemplary smart glasses infer the meaning of the user interactions by splitting gesture recognition into multiple stages of processing complexity/power consumption. Conceptually, each stage roughly corresponds to a level of confidence in gesture-recognition i.e., that the user interaction is a recognizable gesture or portion thereof. Progressively higher levels of processing complexity/power consumption increase the comprehension of implicit meaning from user interaction(s) and/or commensurately scale system functionality.

Functionally, the gesture-driven scalable processing may be subdivided into a control and data processing subsystem and a power management subsystem, each of which are discussed below.

Control and Data Processing Subsystem

Figure 6A:
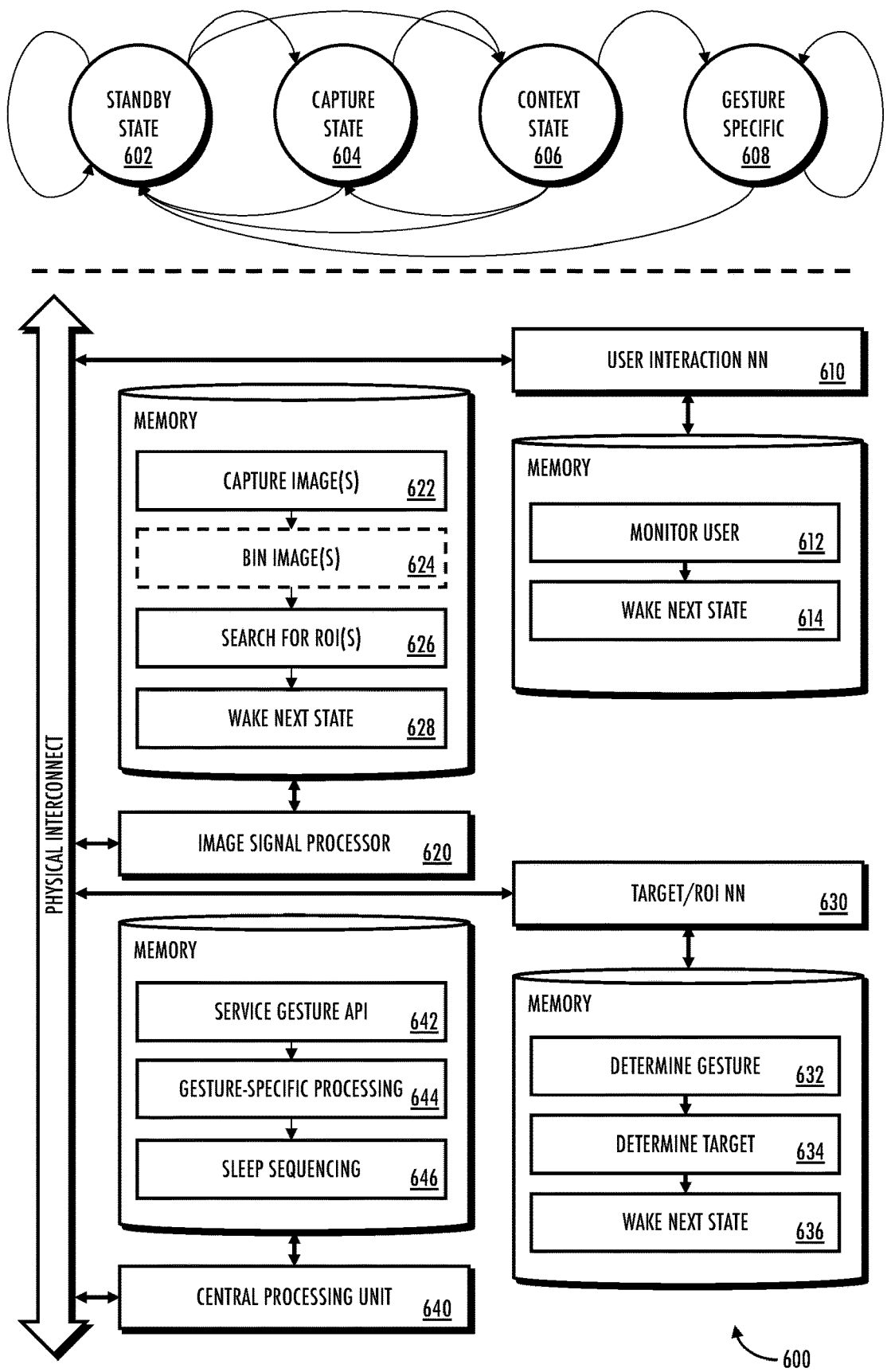
FIG. 6A is a logical block diagram of one exemplary state machine for scalable power management logic.

The control and data subsystem 600 controls the system operation and stores and processes data. In one exemplary embodiment, the control and data subsystem includes processing units that execute instructions stored in a non-transitory computer-readable medium (memory). More generally however, other forms of control and/or data may be substituted with equal success, including e.g., neural network processors, dedicated logic (field programmable gate arrays (FPGAs), application specific integrated circuits (ASICs)), and/or other software, firmware, and/or hardware implementations. As shown in FIG. 6A, the control and data subsystem may include one or more of: a central processing unit (CPU), an image signal processor (ISP), one or more neural network processors (NPUs), and their corresponding non-transitory computer-readable media that store program instructions and/or data.

Processor and Memory Implementations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: operating system (OS) functionality (power management, UX), memory management, gesture-specific tasks, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization.

Other processor subsystem implementations may multiply, combine, further subdivide, augment, and/or subsume the foregoing functionalities within these or other processing elements. For example, multiple ISPs may be used to service multiple camera sensors. Similarly, neural network functionality (discussed below) may be subsumed with either CPU or ISP operation via software emulation.

Neural Network and Machine Learning Implementations

The system may include one or more neural network processors (NPUs). Unlike conventional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Within the context of the present disclosure, the NPUs may be used to analyze the presence of one or more user interaction(s) at varying levels of confidence. Conventional image processing techniques process the entire image data structure, an NPU may process subsets/aspects of the image data. The computational complexity may be scaled according to the stage (which corresponds to the confidence of detection.)). Conceptually, neural network processing uses a collection of small nodes to loosely model the biological behavior of neurons. Each node receives inputs, and generates output, based on a neuron model (usually a rectified linear unit (ReLU), or similar). The nodes are connected to one another at "edges". Each node and edge are assigned a weight.

Each processor node of a neural network combines its inputs according to a transfer function to generate the outputs. The set of weights can be configured to amplify or dampen the constituent components of its input data. The input-weight products are summed and then the sum is passed through a node's activation function, to determine the size and magnitude of the output data. "Activated" neurons (processor nodes) generate output "activations". The activation may be fed to another node or result in an action on the environment. Coefficients may be iteratively updated with feedback to amplify inputs that are beneficial, or dampen inputs that are not.

The behavior of the neural network may be modified during an iterative training process by adjusting the node/edge weights to reduce an error gradient. The computational complexity of neural network processing is a function of the number of nodes in the network. Neural networks may be sized (and/or trained) for a variety of different considerations. For example, increasing the number of nodes may improve performance and/or robustness noise rejection whereas reducing the number of nodes may reduce power consumption and/or improve latency.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic, however neural network processing is still in its infancy (circa 2022) and has not yet become a commoditized semiconductor technology.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training is broadly categorized into "offline" training and "online" training. Offline training models are trained once using a static library, whereas online training models are continuously trained on "live" data. Offline training allows for reliable training according to known data and is suitable for well-characterized behaviors. Furthermore, offline training on a single data set can be performed much faster and at a fixed power budget/training time, compared to online training via live data. However, online training may be necessary for applications that must change based on live data and/or where the training data is only partially-characterized/uncharacterized. Many implementations combine offline and online training to e.g., provide accurate initial performance that adjusts to system-specific considerations over time.

Within the context of the present disclosure, conventional computer vision algorithms generate a post-processed image data (a 2-dimensional array of pixel data) whereas neural network vision computer vision generates activations. Neural network-based image recognition may have multiple advantages over conventional image recognition techniques. Raw image capture data (e.g., photosite values) are camera-specific i.e., the pixel values are a combination of both the photosite and color-filter array geometry. Raw image capture data cannot be directly displayed to a human as a meaningful image-instead raw image data must be "developed" into standardized display formats (e.g., JPEG, TIFF, MPEG, etc.). The developing process incurs multiple ISP image operations e.g., demosaicing, white balance, color adjustment, etc. In contrast, neural network processing can be trained to use raw image data (e.g., photosite values) as input rather than post-ISP image data (as is done with conventional image recognition techniques). Furthermore, neural network activations represent a node state within the neural network i.e., that the node has accumulated signal potential above a threshold value. If properly trained, neural networks can provide robust detection with very little power. Activation data is both much less frequent, and much more compact, compared to post-processed image/video data. Exemplary embodiments (such as shown and discussed above, see FIG. 5) perform neural network processing on-chip at the sensor and can convey activations off-chip. This may be more power efficient than transporting image data off a sensor for conventional computer vision algorithms.

In some embodiments, the neural network processor may be a standalone component of the system. In such implementations, the neural network processor may translate activation data (e.g., neural network node activity) into data structures that are suitable for system-wide use. Typically, such implementations use a data structure defined according to application programming interfaces (APIs) exposed by other components. Functionally, an API interface allows one program to request/provide a service to another program; while the exemplary system allows API calls between separate components, the API framework may be used with equal success within a component. For example, a system-on-a-chip (SoC) may provide the activation data and/or its associated metadata via an API. Some SoC implementations may also provide memory-mapped accessibility for direct data manipulation (e.g., via a CPU).

In some embodiments, the NPU may be incorporated within a sensor (e.g., a camera sensor) to process data captured by the sensor. By coupling an NPU closely (on-die) with the sensor, the processing may be performed with lower power demand. In one aspect, the sensor processor may be designed as customized hardware that is dedicated to processing the data necessary to enable interpretation of relatively simple user interaction(s) to enable more elaborate gestures. In some cases, the sensor processor may be coupled to a memory that is configured to provide storage for the data captured and processed by the sensor. The sensor processing memory may be implemented as SRAM, MRAM, registers, or a combination thereof.

Other Notable Logic Implementations

Application specific integrated circuits (ASICs) and field-programmable gate arrays (FPGAs) are other "dedicated logic" technologies that can provide suitable control and data processing for a smart glasses system. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0 #b'11 and setting all other locations to be "0" the 2-input LUT emulates an AND gate. Conversely, by storing "0" into the location of 0 #b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

Power Management Subsystem

The power management subsystem 700 provides power to the system. Typically, power may be sourced from one or more power sources. Examples of power sources may include e.g., disposable and/or rechargeable chemical batteries, charge storage devices (e.g., super/ultra capacitors), and/or power generation devices (e.g., fuel cells, solar cells). Rechargeable power sources may additionally include charging circuitry (e.g., wired charging and/or wireless induction). In some variants, the power management subsystem may additionally include logic to control the thermal exhaust and/or power draw of the power sources for wearable applications.

During operation, the power management subsystem 700 provides power to the components of the system based on their power state. In one exemplary embodiment, the power states may include an "off" or "sleep" state (no power), one or more low-power states, and an "on" state (full power). Transitions between power states may be described as "putting to sleep", "waking-up", and their various linguistic derivatives.

As but one such example, a camera sensor's processor may include: an "off" state that is completely unpowered; a "low-power" state that enables power, clocking, and logic to check interrupts; a "on" state that enables image capture. During operation, another processor may "awaken" the camera sensor's processor by providing power via the power management subsystem. After the camera sensor's processor enters its low-power state, it services the interrupt; if a capture is necessary, then the camera sensor's processor may transition from the "low-power" state to its "on" state.

Various other power management subsystems may be substituted with equal success, given the contents of the present disclosure.

Scalable Power Management, Example Implementation

The scalable power management solution provides a system and method for low-power image processing via the use of scalable processing. The disclosed solution utilizes a plurality of processors, each having customized processing capabilities that are configured to provide efficient, effective processing of triggering gestures, basic hand gestures, advanced hand gestures, finger gestures, voice commands, or a combination thereof. Further, the disclosed solution provides users with the capability to interact with virtual as well as real-world objects. Such interactions may be utilized as inputs to applications, which may be accessible on an associated electronic device (e.g., a smartphone) or directly via the Internet (e.g., social networking websites that are directly accessible by the smart glasses).

In one specific embodiment, the "scalable power management subsystem" implements logic in hardware, firmware, and/or software to adjust (scale) the power state based on a finite state machine. A finite state machine (or "state machine") refers to a machine that can only be in one of a finite number of "states". Each state has a limited set of valid inputs, outputs, and/or data manipulations. The state machine "transitions" between states in response to certain inputs. A machine is "stateful" if it can consider preceding events or interactions in its logic (i.e., it remembers at least a current and previous state), stateless logic does not consider preceding events/interactions.

Figure 6B:
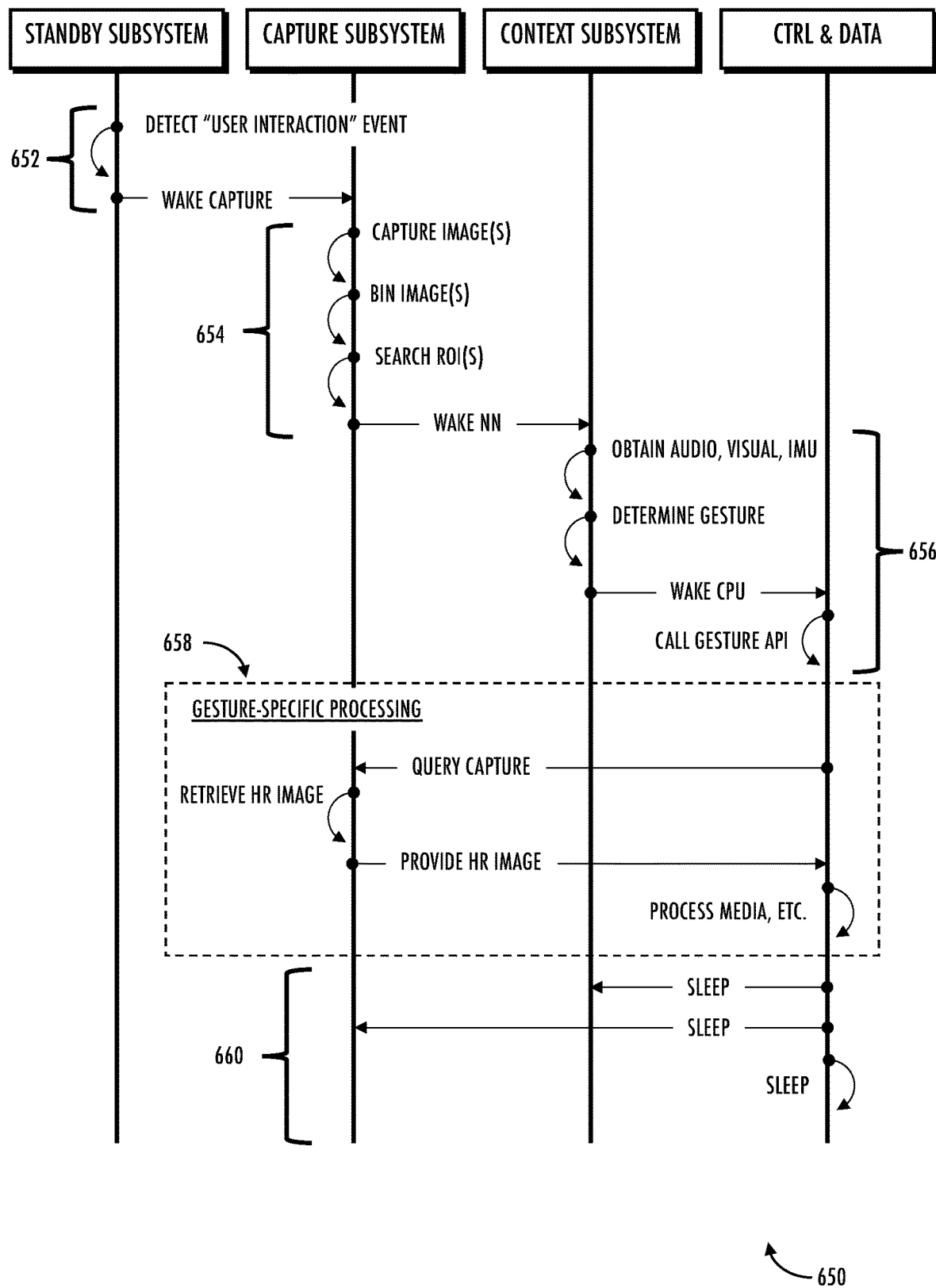
FIG. 6B depicts a ladder diagram of a chronological sequence of power management events, according to the scalable power management logic of FIG. 6A.

FIG. 6A depicts a logical block diagram 600 of one exemplary state machine for scalable power management logic, and its implementation. The illustrated scalable power management has the following states: standby state 602, capture state 604, context state 606, and one or more gesture-specific processing states 608. In addition, FIG. 6B depicts a ladder diagram 650 of a chronological sequence of power management events, according to the scalable power management logic of FIG. 6A.

In one embodiment, the state transitions are handled within different subsystems that are connected via a physical interconnect. Each subsystem may be separately powered and/or clocked at the component level (e.g., with independent power domain and/or clock domain). Subdividing functions into subsystems may offer several benefits e.g., a wider variety of commodity components that are already available and/or reduced specialty component requirements, simple power management logic within each component, etc. Unfortunately, however, transporting data on/off physical interconnects can be quite inefficient compared to integrated alternatives (e.g., logic integrated within a single silicon substrate). Artisans of ordinary skill in the related arts, given the contents of the present disclosure, will readily appreciate that the subdivision of FIGS. 6A-6B are purely illustrative, and that other combinations, divisions, and/or other hybrids may be substituted with equal success.

During the standby state 602, a user interaction neural network 610 monitors for user interactions (step 612). When a user interaction is detected, the state machine wakes the next state (step 614); otherwise, the state machine remains in the standby state 602. (See also, sequence 652 of FIG. 6B). While the standby state is perceived as being "always-on", the capture and processing may occur at very low frequencies (less than 10 Hz, in some implementations). Standby modes may sleep, perform background tasks, or otherwise quiesce between monitoring intervals.

In one exemplary embodiment, the standby state 602 monitors the user with a subset of sensor capabilities to reduce power consumption of the standby state. The capabilities may be reduced by e.g., sensor resolution, sampling rate, post-processing complexity, and/or any other aspect of captured data. For example, an eye-tracking camera may capture images infrequently (2 Hz, 4 Hz, 8 Hz, etc.); similarly, a forward-facing camera may capture images for finger/hand/arm positioning, or a microphone may only be enabled for key word detection, etc. Furthermore, audible and/or visual data may be monitored in its raw sensor formats. For instance, raw image data (photosite values without demosaicing) may be used, audio amplitudes (rather than frequency domain representations) may be used for peak detection, etc.

In one specific implementation, the standby state 602 monitors user interactions using a trained neural network (user interaction neural network 610). Since processing complexity is a function of the number nodes (rather than image size), and neural network processing may be performed on raw sensor data (rather than demosaiced image data), the neural network processing can be trained for very low power consumption (as described in greater detail elsewhere). For an eye-tracking implementation, the user interaction neural network 610 determines when the user's gaze is fixated (determined from a threshold amplitude and threshold time). For a forward-facing implementation, the user interaction neural network 610 determines when an object in the visual field could be a recognized gesture performed by either a user (or a $3^{rd}$ party). For example, the user interaction neural network 610 may be trained to recognize a specific shape, at a position (or with movement), for a threshold time (velocity), etc. Audible and/or haptic variants may monitor for voice commands and/or head motions.

As but one example, a user may create hand-based user interaction(s) that are captured by a front-facing camera of the smart glasses. The user may also perform the hand motion with a voice command. For example, the user may point to an object to target the object for the smart glasses. Next, the user may ask the smart glasses what the price of the object is (e.g., an apple in a store). As another example, the triggering user interaction may be a simple hand wave in view of the front-facing camera. In some cases, a triggering gesture is used before more computationally complex gestures; this may allow wake-up with fewer computational resources and may be well-suited for the standby state 602. For example, the user may wave their hand in front of the smart glasses before performing more computationally intense operations (e.g., typing at a virtual keyboard).

During the capture state 604, a front-facing camera assembly (not shown) and image signal processor 620 capture an image of the user's visual field (step 622). In some variants (step 624), the image may be binned, or otherwise reduced in resolution, frame rate, image quality, or other reduced-power mode. The captured images are searched for potential regions of interest (ROIs) (step 626). When one or more ROIs are detected, the state machine wakes the next state (step 628); otherwise, the state machine remains in the capture state 604, or returns to the standby state 602. (See also, sequence 654 of FIG. 6B.)

Additionally, while the foregoing describes a reduction of resolution, frame rate, image quality, etc. to reduce power, some variants may increase these parameters or make other trade-offs. For example, a higher frame rate could be used with limited processing (gated processing, etc.). This may be useful in situations where hand detection can quickly occur (e.g., if a hand is not present, then return to standby/sleep; otherwise increase to higher processing). In some cases, this may be preferred to reduce latency.

As a brief aside, the standby state 602 may capture some image data, however the image data may be unsuitable for object recognition. More directly, scene processing may be a computationally intense activity given the operating environment and/or intended application of the smart glasses. However, scene processing may be highly relevant to smart glasses adoption. For example, scene processing may be needed for "life blogging" where the user continuously records the events seen through their smart glasses (a form of electronic journaling). To handle these types of applications, various embodiments of the present disclosure re-capture the user's visual field at a resolution, frame rate, and/or image quality that is suitable for subsequent vision processing. In one embodiment, the captured image data may be stored at the sensor's maximum fidelity for later use, but processed at a reduced resolution (e.g., a nona-binned resolution) for this state. Subsequent gesture processing may re-use the full fidelity captured image data (rather than triggering another capture).

The front-facing camera assembly (described in greater detail elsewhere) may include one or more lenses that focus light onto an array of photosites (a charge-coupled device (CCD)) through a color filter array (CFA). In some implementations, the forward-facing camera's image signal processor (ISP) 620 reads raw photosite values from the CCD, and then applies image signal processing algorithms to "develop" the raw photosite values into meaningful image data e.g., autofocus, autoexposure, demosaicing, white balance, color correction, etc. The resulting image data may be stored as a "developed image" of pixel data; different pixel formats store color and/or luminance data as arrays of numeric tuples (e.g., $RG_1G_2B$, YCrCb, etc.). The developed images may be searched with conventional image detection algorithms (e.g., object (hand) recognition, facial recognition) on a pixel-by-pixel addressing basis (quadratic complexity). In other variants, the forward-facing camera may include an on-board neural network processor (not shown) that has been specifically trained for hand and/or target recognition. As previously noted, neural network processing complexity is a function of the number nodes (rather than image size), and neural network processing may be performed on raw sensor data (rather than demosaiced image data).

Data transfers over the physical interconnect may consume a significant amount of power to amplify the signal from in-silicon logic to IO pad, and drive the physical interconnect (usually copper wire, with a termination impedance) via the IO pad. As a practical matter, each bit of data transmission incurs this transmission loss, thus reducing data size can yield substantial power efficiencies. In one optimized embodiment, the detected ROI(s) (if any) are cropped and provided to the next stage (rather than the raw photosite values/developed image data). This may greatly reduce data transmission sizes since the gesture and/or target ROIs are likely only a small portion of the entire image field.

If the captured visual data does not include any ROI(s), then the capture state 604 can transition back to the standby state 602. For instance, if the capture subsystem cannot identify hands in the developed image and/or an object that the user has fixated on, then the capture subsystem assumes a false detection and returns to standby operation.

While the foregoing examples are presented in the context of visual data, a variety of different sensor modalities may also be captured during this stage. For example, the device may enable audio capture and/or inertial measurements. Audio data may be useful for certain types of transactions; for example, a handshake can be visually identified from hand positioning and associated with an audible recording of greetings/keywords ("Hi Te-Won, Nice to meet you, my name is Edwin.") Additionally, other user interactions may not require the use of the hands. For example, a head bow or curtsy may use IMU data instead of hand ROIs.

In some cases, the system may capture (or otherwise obtain) other contextual information. For example, smart glasses may identify its current location (via GPS, etc.) and/or the current time. Spatial and/or temporal contextual clues may be useful when cross-referenced to a user's schedule and/or route information. For instance, calendar information may include information about other meeting attendees. Similarly, GPS coordinates may be useful to determine whether the gesture is related to work, healthcare, recreation, or other miscellaneous personal activities. In some such variants, time and/or location may modify the meaning of certain gestures. For example, a grasping hand motion, made with both hands in opposing directions, may be used to gesture "opening a newspaper" when used at home, "opening a menu" when used at a restaurant, "open a slideshow" when used at work, etc. As another example, rotating an imaginary dial on the back of a wrist may be used to "set a snooze timer" (minute increments) when used in the morning or to "set a wake-up timer" (hour increments) when used at night. Still other variants may combine both time and place; for example, a handshake gesture may trigger a contact look-up in both a daily calendar and/or address book.

During the context state 606, a neural network processor 630 obtains the different modalities of captured sensor data (audio, visual, IMU, etc.) and/or any potential contextual clues to determine a gesture (step 632) and/or target of a gesture (step 634). If a valid gesture and/or target of the gesture is identified, then the neural network processor 630 can wake the central processing unit 640 to perform gesture-specific processing (step 636). (See also, sequence 656 of FIG. 6B.). Otherwise, the system may attempt a re-capture (capture state 604) or return to standby (standby state 602).

As a brief tangent, gestures can be highly idiosyncratic; existing solutions for gesture recognition attempt to train on generalized libraries. This can be suboptimal for both error rejection performance (false positive/false negative) and processing complexity/power consumption. More directly, gesture recognition against the library of possible gestures is both over-inclusive, and under-performant. Training the neural network processor 630 on the user's own mannerisms greatly improves recognition accuracy and efficiency—the neural network processor 630 can be trained to recognize where (in the visual field) and/or how (hand positioning relative to gaze point) a gesture is typically made. For example, a user is likely to use a dominant hand of fixed size and complexion, and a relatively limited set of hand positionings relative to their eyes. By training on the location of the user's hands relative to the eyes, these techniques also allow the user to use their own natural mannerisms and/or culturally relevant gestures.

Figure 7A:
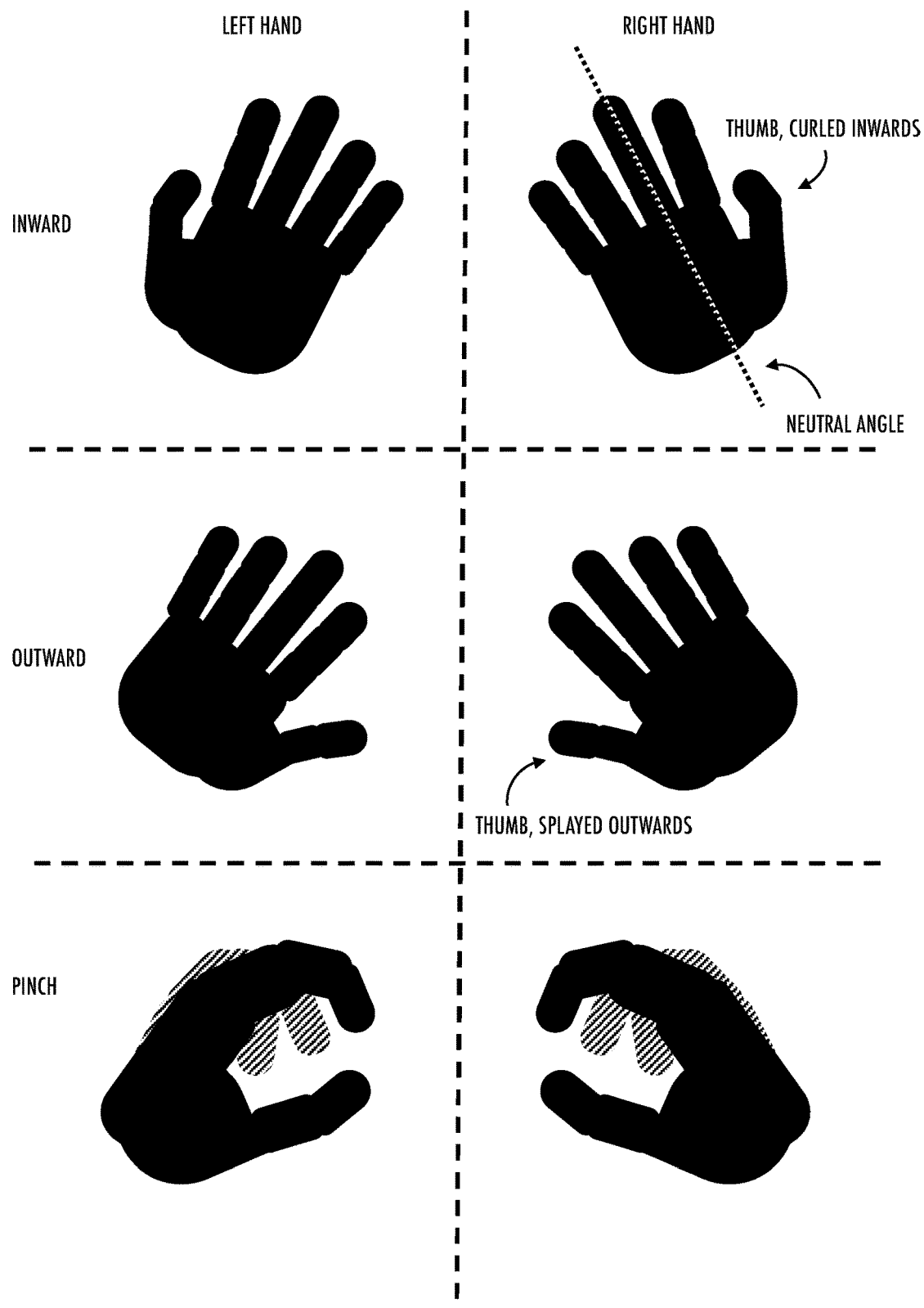
FIGS. 7A-7D illustrate various hand positionings for both right and left hands, useful in accordance with the various aspects of the present disclosure.

To train the system, the user may be prompted to perform certain user interactions during a set-up sequence. FIG. 7A illustrates various hand positionings (e.g., "palm inward", "palm outward", "pinch", "etc.) for both right and left hands. This set-up sequence may be used to determine the approximate shape, size, according to the user's natural positioning. Certain physical characteristics may be particularly important for low-power recognition and may be emphasized with multiple image captures during the training sequence. For example, the location of the thumbs and the neutral angle for wrist alignment may be heavily weighted to determine whether the hands are rotated inwards or outwards.

Figure 7B:
Figure 7B:
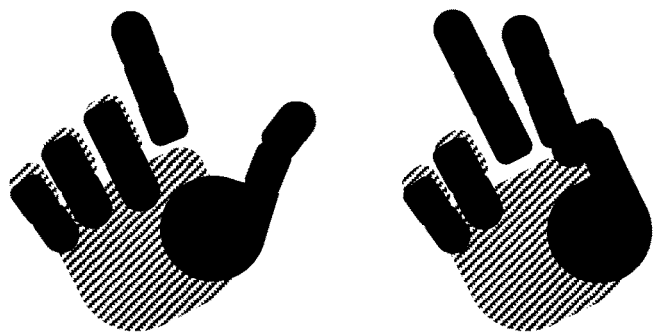
Figure 7B:
Figure 7B:
Figure 7B:
Figure 7C:
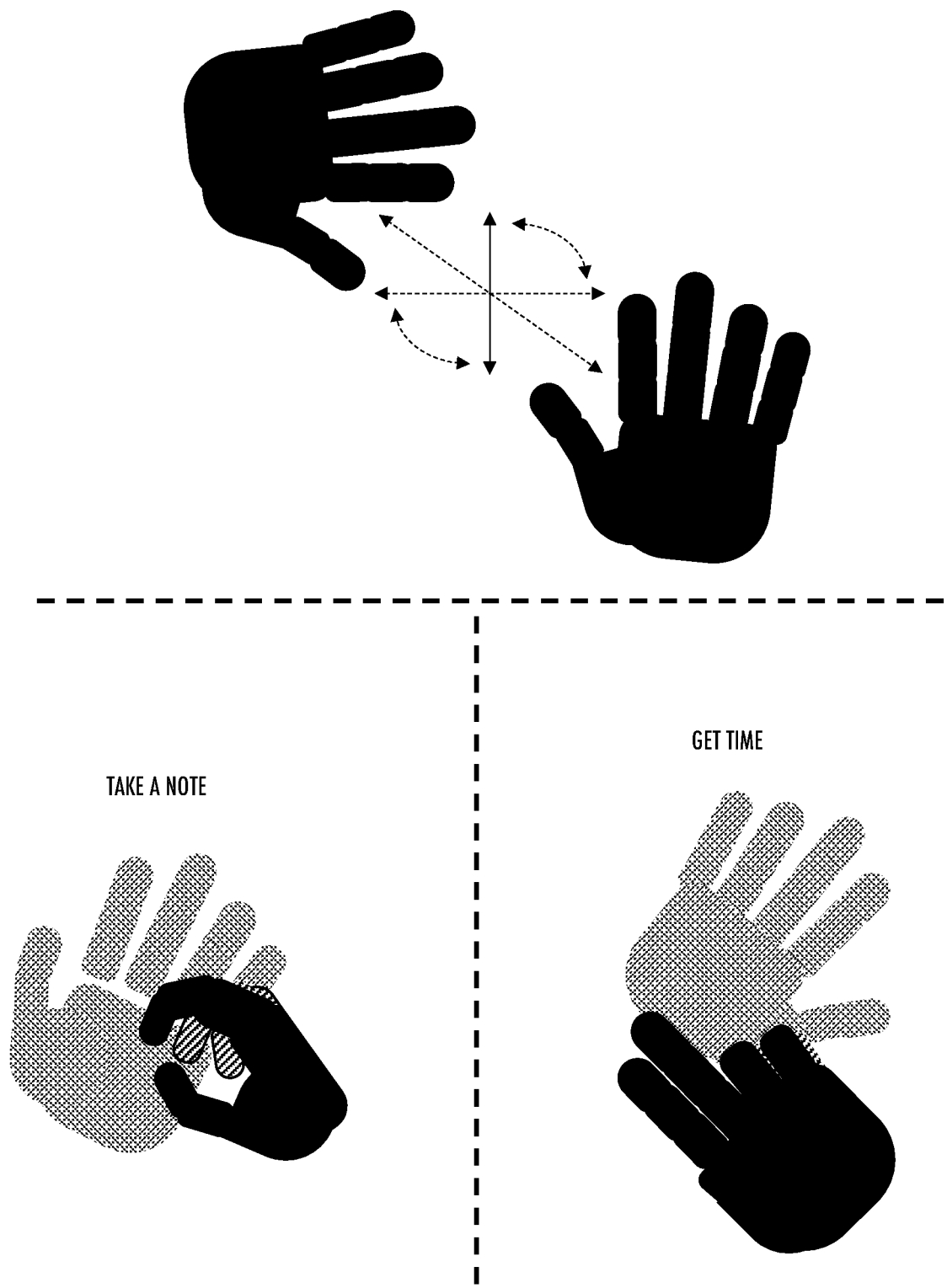

Certain "prioritized" and/or "shorthand" finger positionings (for one or both hands) may be part of the training set. FIGS. 7B and 7C illustrate a set of such prioritized hand/finger positionings for one and/or two hands. In one such training sequence, the user may be instructed to count on their fingers from one to five (or ten, for both hands). Different users may count differently, for example some users may represent two with the index finger and thumb;

other users may use their index and middle fingers. Other examples of useful finger positioning may include e.g. symbols (e.g., thumbs up, thumbs down, picture frame, "take a note", "get time", etc.), letters (e.g., in a "signing" language such as American Sign Language (ASL)), numbers, phrases, punctuation, and/or other conversational idioms.

Figure 7D:
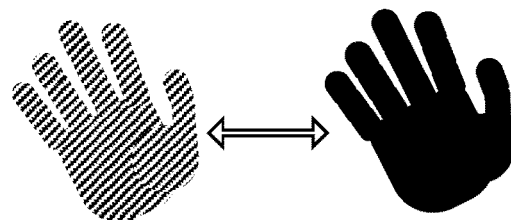
Figure 7D:
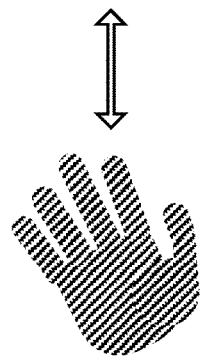
Figure 7D:
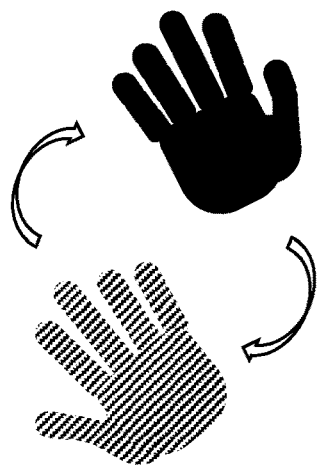

In addition to hand/finger positioning, the set-up sequence may also include various motions at various speeds, according to the user's natural positioning. FIG. 7D illustrates various hand motions (e.g., "swipe left/right", "swipe up/down", "rotate inward/outward", "etc.) for one or both right and left hands. This set-up sequence may be used to determine the approximate velocity, range, angle, and/or tolerances for hand motion. Since motion requires multiple temporally related captures, the user's physical speed and range of motion may be particularly important to determine e.g., sampling rate, capture settings (shutter angle, exposure, ISO, etc.) and/or the number of images necessary to accurately determine velocity in low power modes. For example, a user that swipes quickly may require a faster frame rate. Different skin complexions may also need different capture frame rates according to ambient light conditions; e.g., light skin may need slower shutter angles in high-light conditions, dark skin may need faster shutter angles in low-light conditions.

For offline training variants, the set-up process may be performed once (or on an as-needed basis). A user-specific training library is generated from the set-up captures; this library may then be used for training (i.e., a "static" library). In online variants, the system may have a basic training library that is augmented with live data from successfully recognized and/or rejected gestures. An online training model dynamically updates the user interaction libraries with true-positives/true-negatives and false-positives/false-negatives gathered during user operation. In either implementation, the smart glasses may undergo re-training when charging or otherwise instructed to do so. While the foregoing examples are provided in the context of visual data, the neural network processor may also be trained to consider multiple different sensor modalities as well. For example, the target ROI and/or gesture ROI (provided by the forward-facing camera) may additionally require verbal cues, IMU data, and/or eye-tracking information to infer the user's intended gesture.

In one exemplary embodiment, the gestures are subdivided and categorized into their constituent user interaction (s). These exemplary subdivisions may reduce training complexity, since the set-up training process may be simplified to focus on the individual user interaction(s), rather than an entire gesture. For instance, the user may train and calibrate different combinations of two-handed positions, one-handed positions, and gaze fixation. This may be much shorter and more convenient to train (offline or online), compared to a full enumeration of all user interactions for all gestures (e.g., left-swipe with left hand, right-swipe with left hand, left-swipe with right hand, right-swipe with right hand, etc.). As a related benefit, subdividing gestures into their constituent user interaction(s) may also improve error rejection (false positives, false negatives) both during offline training, as well as during operation (or online training).

Table 2 provides a brief selection of two-handed gestures using a distinct gaze point. In these gestures, the gaze point may be used to identify an object (or its AR/XR representation), and the positioning and/or velocity of both hands may specify the desired operation.

TABLE 2

| Two-Handed with Distinct Gaze Point | |
| --- | --- |
| Gesture Modality | Illustrative Examples of Gestured Instruction |
| 2 hands, perpendicular; offset around a gaze point | Frame for photo/video for capture. |
| 2 hands, parallel; offset from a gaze point | Selecting an object, or its AR/XR representation. |
| 2 hands, 180° opposed; offset from a gaze point | Handshake, fist bump, or similar greeting to store an image of a face with contact information. This may also be treated as a one-handed gesture (since the other person's hand may be unknown), depending on implementation. |
| 2 hands, swiping together, left/right, up/down; offset from a gaze point | Jump to start/end of a document or other content identified by the object (e.g., a menu identified by a QR code, etc.). Jump to previous/next document of a set of documents or other content identified by the object. |
| 2 hands, swiping diagonally opposed; offset from a gaze point | Zoom into/out-of a document identified by the object (e.g., a menu identified by a QR code, etc.). |
| 1 pinched hand, swiping up; 1 pinched hand, swiping down; offset from a gaze point | "Ripping-up" (deleting) a document identified by the object (e.g., a menu identified by a QR code, etc.) |
| 2 hands, perpendicular; rotating around a gaze point | Rotate a document identified by the object (e.g., a menu identified by a QR code, etc.) |
| 2 hands with a trained finger/hand positioning; offset from a gaze point | Apply the shorthand operation to the object (e.g., "take a note" of the menu identified by a QR code, "get time" left on a cooking timer, etc.) |

Table 3 provides a brief selection of one-handed gestures using a distinct gaze point. Here, the one-handed gesture may be used to select, or otherwise manipulate the object (or its AR/XR representation).

Within the context of the present disclosure, certain finger positionings and/or motions may be associated with their colloquial descriptions. For example, the term "point" refers to a hand with one or more fingers outstretched. Similarly, a "pinch" refers to a hand with one or more fingers meeting the thumb. In some variants, there may be multiple recognized pinches (e.g., an index pinch, a middle pinch, a two-finger pinch, etc.). As another such example, a "grasp" refers to a hand with multiple fingers closing into the palm. Each of the foregoing positionings may also differentiate between different wrist and/or hand rotations (e.g., inward, outward, left, and/or right facing variants).

While the user interactions of Tables 2-4 are described in the context of visual input, a broad range of user interactions may be used in independent of, or to augment, the visual user interactions. Table 5 provides a brief selection of user interactions and possible usages.

TABLE 3

One-Handed with Distinct Gaze Point

| Gesture Modality | Illustrative Examples of Gestured Instruction |
| --- | --- |
| 1 hand swiping left/right, up/down; offset from a gaze point | Flip a "page" of a document or other content identified by the object (e.g., a menu identified by a QR code, etc.) |
| 1 hand, pointing or pinching; relative to a gaze point | Selecting an object (or its AR/XR representation). |
| 1 hand, circling; relative to a gaze point | Capture and crop area, transcribe area to a note, or record the location with an object for a subsequent manipulation. |
| 1 hand, pinch, move, and release to a location; offset from a gaze point | Selecting an object (or its AR/XR representation) and storing ("placing") the object within a virtual location. |
| 1 hand, pinch, move, and release to a position on a (real or virtual) clock; offset from a gaze point | Selecting an object (or its AR/XR representation) and associating the object to a virtual time. For example, setting a cooking time reminder for a pot on the stove. |
| 1 hand, with a trained finger/hand positioning; offset from a gaze point | User input associated to an object (or its AR/XR representation). Example #1, "T" for Text or "C" for Call a person identified by a business card, picture, or QR code. Example #2, "A" for Audio to hear a snippet of music for an artist identified by a picture or QR code, etc. Example #3, "L" to add an item to a Shopping List, or a Restaurant Order. Example #4, "V" to add an AR/VR sticker. Example #5, "U" to capture an image when a person smiles. |

Table 4 provides a brief selection of gestures without any distinct gaze point (e.g., the eyes are not fixated, or where the gaze is fixated on one or both hands). In these gestures, the user's primary focus is not associated with an object in the external environment. Typically, these gestures may be made in response to a system prompt, or where the user may not need any AR/XR feedback.

TABLE 4

Indistinct Gaze Point, Any Number of Hands

| Gesture Modality | Illustrative Examples |
| --- | --- |
| 1 hand, with a trained finger/hand positioning; No discernable gaze point. | User input in response to a prompt. For example, subjective user mood input for a health monitoring application (thumbs up/thumbs down, scale of 1-10, etc.). |
| 1 hand grasp, swiping left; 1 hand grasp, swiping right; No discernable gaze point. | "Open-up" a pre-defined feed of content (e.g., opening a newspaper.). |
| 1 hand, twirling in a clockwise/counterclockwise direction; No discernable gaze point. | Rewind/fast-forward audio. |
| 2 hands interlaced, clapping, or otherwise arranged; No discernable gaze point. | User configurable. |

TABLE 5

Miscellaneous Other User Interactions

| Gesture Modality | Illustrative Examples |
| --- | --- |
| A head motion ("nod"). | User input in response to a prompt. For example, a "yes" or "no" |
| One or both eye(s) blink. | An instantaneous selection; may need association with other user interactions (e.g., an audible countdown, or similar mechanism to filter out normal eye blinks) |
| Crossing/uncrossing of arms. | Crossing arms indicating "incorrect" or disagreement, etc. |
| An audible instruction or wake word. | User configurable. |
| Time and/or Location information | May be used to modify the meaning of the same gesture in different times/places. |

During the gesture-specific state 608, a central processing unit 640 is awakened to service the gesture API call from the neural network processor 630 (step 642). The gesture-specific processing may entail processing previously captured data or capturing additional data for processing (step 644). (See also, sequence 658 of FIG. 6B.)

In the illustrated embodiment, the CPU 640 controls the system components and performs data manipulations to service the gesture as a series of tasks. In some cases, the CPU 640 may need to obtain more capture information (e.g., a complete image, higher resolution version of the image, etc.). For instance, the CPU 640 may retrieve a previously stored high resolution image capture (from the ISP 620) for processing (shown in FIG. 6B). Examples of such tasks may include e.g., posting an image to social media, de-referencing a URL embedded within a QR code, etc. In other implementations, the gesture API call may be a self-contained data structure or data manipulation. In such cases, the CPU 640 may process the gesture locally without further input (not shown). Examples of such gestures may include e.g., thumbs up/down, get time, take note, etc. Still other implementations may require the CPU 640 to coordinate multiple subsystems for an ongoing task. Such implementations may include e.g., framing a shot for a subsequent video, etc.

Once awakened, the AR/XR interface may allow the user to sequentially chain together multiple complex gestures. For example, a user may "frame" an image capture, then use multiple gestures to perform subsequent image post-processing (e.g., crop, stabilize, apply filters and/or virtual stickers, etc.). In other words, it may be more power efficient/responsive to keep the system awake for a short interval after gesture-specific processing.

Once the user has finished interacting with the system, the CPU 640 may put the system components back to sleep (sleep sequencing 646). (See also, sequence 660 of FIG. 6B.) In the illustrated sleep sequence, the CPU puts the context determination subsystem, capture subsystem, and control and data subsystems back to sleep. The standby subsystem is kept active to monitor for subsequent gestures. While the illustrated sleep sequence is shown after processing has completed, artisans of ordinary skill in the related arts will readily appreciate that sleep sequencing may be performed at any point for any component which is no longer needed for service. For example, the ISP 620 can be immediately put to sleep if no further image data is required.

Functional Overview of the Data/Network

During normal operation, the smart glasses may communicate with one or more other electronic device(s). The electronic device may be a smartphone, a computing device, a computer, a laptop, a server, a smart television, a kiosk, an interactive billboard, etc. In some cases, the system may also need to access remote data (accessed via an intermediary network). For example, a user may want to look up a menu from a QR code (which visually embeds a network URL) or store a captured picture to their social network. In some cases, the user may want to store media to removable data. These transactions may be handled by a data interface and/or a network interface.

The network interface may include both wired interfaces (e.g., Ethernet and USB) and/or wireless interfaces (e.g., cellular, local area network (LAN), personal area network (PAN)) to a communication network. As used herein, a "communication network" refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). For example, smart glasses may directly connect, or indirectly tether to another device with access to, the Internet.

The data interface may include one or more removeable media. Removeable media refers to a memory that may be attached/removed from the system. In some cases, the data interface may map ("mount") the removable media to the system's internal memory resources to expand the system's operational memory.

Network Interface

The network interface may include one or more radios and/or modems. While the following discussion is presented in the context of 5G cellular networks, artisans of ordinary skill in the related arts will readily appreciate that future communication subsystems may use higher generation technologies (e.g., 6th Generation (6G), etc.). In some implementations, the last mile connectivity may be provided via Wi-Fi or another short-range wireless communication protocol. Still other network connectivity solutions may be substituted with equal success, by artisans of ordinary skill given the contents of the present disclosure.

In one exemplary embodiment, the radio and modem are configured to communicate over the "last mile" using a 5th Generation (5G) cellular network. As used herein, the term "modem" refers to a modulator-demodulator for converting computer data (digital) into a waveform (baseband analog). The term "radio" refers to the front end portion of the modem that upconverts and/or downconverts the baseband analog waveform to/from the RF carrier frequency. Here, the "last mile" metaphorically refers to the final leg of the telecommunication network, rather than an actual distance.

As a brief aside, the 5G cellular network standards are promulgated by the $3^{rd}$ Generation Partnership Project (3GPP) consortium. The 3GPP consortium periodically publishes specifications that define network functionality for the various network components. For example, the 5G system architecture is defined in 3GPP TS 23.501 (System Architecture for the 5G System (5GS), version 17.5.0, published Jun. 15, 2022; incorporated herein by reference in its entirety). As another example, the packet protocol for mobility management and session management is described in 3GPP TS 24.501 (Non-Access-Stratum (NAS) Protocol for 5G System (5G); Stage 3, version 17.5.0, published Jan. 5, 2022; incorporated herein by reference in its entirety).

5G networks offer different types of network coverage functionality (referred to as "network slices"). Currently, there are three main application areas for the enhanced capabilities of 5G. They are Enhanced Mobile Broadband (eMBB), Ultra Reliable Low Latency Communications (URLLC), and Massive Machine Type Communications (mMTC).

Enhanced Mobile Broadband (eMBB) uses 5G as a progression from 4G LTE mobile broadband services, with faster connections, higher throughput, and more capacity. eMBB is primarily targeted toward traditional "best effort" delivery; in other words, the network does not provide any guarantee that data is delivered or that delivery meets any quality of service. In a best-effort network, all users obtain best-effort service such that the overall network is resource utilization is maximized. In these network slices, network performance characteristics such as network delay and packet loss depend on the current network traffic load and the network hardware capacity. When network load increases, this can lead to packet loss, retransmission, packet delay variation, and further network delay, or even timeout and session disconnect.

Ultra-Reliable Low-Latency Communications (URLLC) network slices are optimized for "mission critical" applications that require uninterrupted and robust data exchange. URLLC uses short-packet data transmissions which are easier to correct and faster to deliver. URLLC was originally envisioned for autonomous vehicles and online gaming. URLLC is useful where eMBB cannot provide the reliability and latency requirements to support the real-time data processing requirements.

Massive Machine-Type Communications (mMTC) was designed for Internet of Things (IoT) and Industrial Internet of Things (IIoT) applications. mMTC provides high connection density and ultra-energy efficiency. mMTC allows a single GNB to service many different UEs with relatively low data requirements; for example, a smart appliance can provide infrequent logging, metering, and/or monitoring applications.

Different network slices may have different ongoing power requirements. Thus, the scalable power management system may establish a network connection based on gesture requirements. For example, the gesture-based processing that can be performed at best effort and/or low data requirements may be initialized via e.g., 5G enhanced Mobile Broadband (eMBB) or massive Machine Type Communications (mMTC) network slices). Other more aggressive augmented reality and/or extended reality implementations may use e.g., ultra-reliable low latency communications (URLLC) network slices.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for multi-stage hands-free gesture-based user interface processing, comprising:
    an inward-facing eye-tracking camera sensor;
    an outward-facing camera sensor;
    a scalable processing subsystem comprising at least a first processor, a second processor different from the first processor, and a power source;
    a first non-transitory computer-readable medium comprising a first set of instructions that when executed by the first processor, causes the first processor to:
        monitor a user for a gaze fixation via the inward-facing eye-tracking camera sensor;
        determine a user gaze point via the inward-facing eye-tracking camera sensor in response to determining the gaze fixation; and
        cause the scalable processing subsystem to determine whether to wake the second processor based on the determining the gaze fixation; and
    a second non-transitory computer-readable medium, different from the first non-transitory computer-readable medium, comprising a second set of instructions that when executed by the second processor, causes the second processor to:
        obtain data comprising a second user interaction captured by the outward-facing camera sensor;
        determine a target region-of-interest based on the user gaze point and the data; and
        perform gesture-specific processing based on the target region-of-interest and the second user interaction.

2. The apparatus of claim 1, where:
    the second user interaction includes a first user hand position, and
    the second set of instructions that when executed by the second processor, further causes the second processor to:
        determine a first gesture region-of-interest based on the first user hand position.

3. The apparatus of claim 2, where:
    a third user interaction includes a second user hand position different from the first user hand position, and
    the second set of instructions that when executed by the second processor, further causes the second processor to:
        determine a second gesture region-of-interest different from the first gesture region-of-interest based on the second user hand position.

4. The apparatus of claim 1, where the second processor is awakened from a sleep power state.

5. The apparatus of claim 1, where:
    monitoring the user for the gaze fixation comprises monitoring the user for a gaze characterized by an eye movement below a threshold amplitude for at least a threshold duration, and
    determining the user gaze point comprises determining a position of the gaze.

6. An apparatus for multi-stage hands-free gesture-based user interface processing, comprising:
    a first sensor and a second camera sensor;
    a power source;
    a first processor and a second processor different from the first processor;
    a first non-transitory computer-readable medium comprising a first set of instructions that when executed by the first processor, causes the first processor to:
        monitor a user for a first user interaction via the first sensor;
        detect the first user interaction; and
        wake the second processor in response to detecting the first user interaction; and
    a second non-transitory computer-readable medium, different from the first non-transitory computer-readable medium, comprising a second set of instructions that when executed by the second processor, causes the second processor to:
        capture one or more images via the second camera sensor; and
        search for a first region-of-interest, based on the detection of the first user interaction via the first sensor, within the one or more images captured by the second camera sensor.

7. The apparatus of claim 6, where:
    the first sensor comprises an eye-tracking camera sensor, and
    detection of the first user interaction comprises detecting a gaze fixation below a threshold amplitude of eye movement for at least a threshold duration.

8. The apparatus of claim 6, where the first sensor comprises a forward-facing camera sensor and a machine learning logic trained on one or more user-specific hand positions; and
    the first user interaction comprises a first user-specific hand position.

9. The apparatus of claim 6, where the first sensor comprises a microphone and a machine learning logic trained on a user-specific voice command; and
    the first user interaction comprises the user-specific voice command.

10. The apparatus of claim 6, where the one or more images are captured at a binned resolution that is less than a full resolution of the second camera sensor.

11. The apparatus of claim 6, where the first region-of-interest is based on a gaze point.

12. The apparatus of claim 11, where the second set of instructions further causes the second processor to search for a second different region-of-interest within the one or more images based on a hand positioning.

13. An apparatus for multi-stage hands-free gesture-based user interface processing, comprising:
 a camera sensor;
 a power source;
 a first processor and a second processor;
 a first non-transitory computer-readable medium comprising a first set of instructions that when executed by the first processor, causes the first processor to:
  capture one or more images via the camera sensor;
  search for a first region-of-interest within the one or more images; and
  wake the second processor when the first region-of-interest is detected; and
 a second non-transitory computer-readable medium comprising a second set of instructions that when executed by the second processor, causes the second processor to:
  determine a gesture based on one or more user-specific hand positions; and
  determine a target based on the first region-of-interest.

14. The apparatus of claim 13, where the one or more images are captured at a binned resolution that is less than a full resolution of the camera sensor.

15. The apparatus of claim 13, where the first region-of-interest is based on a user gaze point that is distinct from the one or more user-specific hand positions.

16. The apparatus of claim 15, where the first set of instructions further causes the first processor to search for a second different region-of-interest within the one or more images based on the one or more user-specific hand positions.

17. The apparatus of claim 16, where the first set of instructions further causes the first processor to:
 crop the one or more images to create a cropped first region-of-interest and a cropped second region-of-interest; and
 transfer the cropped first region-of-interest and the cropped second region-of-interest to the second processor.

18. The apparatus of claim 13, where the target is determined to be one of a person, a landmark, an object, a landscape, or a vehicle.

19. The apparatus of claim 13, where the first region-of-interest is based on a user gaze point that is indistinct from the one or more user-specific hand positions and the target is determined to be a hand/finger positioning.

20. The apparatus of claim 13, where:
 the camera sensor comprises an eye-tracking camera,
 the second processor is different from the first processor,
 the first non-transitory computer-readable medium is different from the second non-transitory computer-readable medium,
 searching for the first region-of-interest comprises searching for a user gaze within the one or more images captured by the eye-tracking camera,
 waking the second processor comprising waking the second processor when the user gaze is detected, and
 determining the target comprises:
  determining a gaze point of the user gaze,
  identify a target region-of-interest based on the user gaze, and
  identify the target based on the target region-of-interest.

* * * * *